(12) United States Patent
Okazaki et al.

(10) Patent No.: US 10,551,678 B2
(45) Date of Patent: Feb. 4, 2020

(54) LIQUID CRYSTAL DISPLAY DEVICE

(71) Applicant: SHARP KABUSHIKI KAISHA, Sakai, Osaka (JP)

(72) Inventors: Tsuyoshi Okazaki, Sakai (JP); Yuko Teraoka, Sakai (JP); Hiroshi Tsuchiya, Sakai (JP); Masanobu Mizusaki, Sakai (JP); Kiyoshi Minoura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/141,858

(22) Filed: Sep. 25, 2018

(65) Prior Publication Data

US 2019/0094592 A1  Mar. 28, 2019

(30) Foreign Application Priority Data

Sep. 25, 2017  (JP) ................. 2017-183818

(51) Int. Cl.
*G02F 1/1335* (2006.01)
*G02F 1/13363* (2006.01)
*G02F 1/1337* (2006.01)

(52) U.S. Cl.
CPC ........ *G02F 1/13363* (2013.01); *G02F 1/1337* (2013.01); *G02F 1/133528* (2013.01); *G02F 2001/133531* (2013.01); *G02F 2001/133631* (2013.01); *G02F 2001/133633* (2013.01); *G02F 2001/133738* (2013.01); *G02F 2001/133742* (2013.01); *G02F 2413/02* (2013.01)

(58) Field of Classification Search
None
See application file for complete search history.

(56) References Cited

U.S. PATENT DOCUMENTS

2013/0050630 A1* 2/2013 Jung ................. G02F 1/13378
349/144

FOREIGN PATENT DOCUMENTS

WO  2012/108311 A1  8/2012

OTHER PUBLICATIONS

Yuichiro Yamada et al., "Investigation of Transmittance Dependence upon Pre-Tilt Angle in Photo Aligned Vertical LCDs", SID 2017 Digest, 2017, pp. 708-711.

* cited by examiner

*Primary Examiner* — Richard H Kim
(74) *Attorney, Agent, or Firm* — ScienBiziP, P.C.

(57) ABSTRACT

A liquid crystal display device includes: a first polarizing plate; a first substrate; a first vertical alignment film; a liquid crystal layer; a second vertical alignment film; a second substrate; and a second polarizing plate, wherein a first retardation layer is disposed between the first polarizing plate and the liquid crystal layer and includes first and second areas having mutually different in-plane phase differences, a second retardation layer is disposed between the second polarizing plate and the liquid crystal layer and includes third and fourth areas having mutually different in-plane phase differences, the first and third areas overlap boundaries between at least four domains of liquid crystal molecules in a pixel region and have an in-plane phase difference in a predetermined range, and in-plane slow axes of the first and third areas and absorption axes of the first and second polarizing plates each have a predetermined azimuth.

8 Claims, 7 Drawing Sheets

LIQUID CRYSTAL DISPLAY DEVICE

CROSS-REFERENCE TO RELATED APPLICATIONS

The present application claims priority under 35 U.S.C. § 119 to Japanese Patent Application No. 2017-183818 filed on Sep. 25, 2017, the contents of which are incorporated herein by reference in their entirety.

BACKGROUND OF THE INVENTION

Field of the Invention

The present invention relates to liquid crystal display devices. More specifically, the present invention relates to liquid crystal display devices in which one pixel region is divided into multiple domains (alignment regions).

Description of Related Art

Liquid crystal display devices are display devices that employ a liquid crystal layer (liquid crystal molecules) to display images. According to a typical display method of liquid crystal display devices, light is applied from a backlight unit to a liquid crystal display panel including a liquid crystal layer between paired substrates, and a voltage is applied to the liquid crystal layer to change the alignment of the liquid crystal molecules so as to control the amount of light that is transmitted through the liquid crystal display panel.

Such liquid crystal display devices have advantages such as thin profile, light weight, and low power consumption, and are thus used in applications such as smartphones, tablet PCs, and automotive navigation systems. In these applications, for example, there is a demand for better viewing angle characteristics. WO 2012/108311 and Y. Yamada, et al. ("Investigation of Transmittance Dependence upon Pre-Tilt Angle in Photo Aligned Vertical LCDs", SID 2017 DIGEST, 2017, pp. 708-711), for example, examine alignment division techniques that divide one pixel region into multiple domains (alignment regions) and align liquid crystal molecules along a different azimuth in each domain.

BRIEF SUMMARY OF THE INVENTION

Unfortunately, use of an alignment division technique sometimes results in dark lines at the boundaries of domains of mutually different tilt azimuths (alignment azimuths) of liquid crystal molecules, which in turn results in low transmittance (contrast ratio).

FIG. 14 is a schematic plan view showing exemplary tilt azimuths of liquid crystal molecules in a pixel region of a conventional liquid crystal display device that employs an alignment division technique. As shown in FIG. 14, when a voltage is applied to a liquid crystal layer, a pixel region 40 is divided into four domains of mutually different tilt azimuths of liquid crystal molecules 31. Here, in the case of a liquid crystal display device including a pair of polarizing plates, one at each side of a liquid crystal display panel, wherein the azimuth of the absorption axis of one of the polarizing plates corresponds to an X-axis direction and the azimuth of the absorption axis of the other polarizing plate corresponds to a Y-axis direction (i.e., the pair of polarizing plates are arranged in crossed Nicols), the tilt azimuths of the liquid crystal molecules 31 are parallel to the X-axis direction or the Y-axis direction at the boundaries of the four domains. Thus, in regions overlapping the boundaries between the four domains, linearly polarized light transmitted through one of the polarizing plates cannot be transmitted through the other polarizing plate after passing through the liquid crystal layer, so that these regions are visibly recognizable as dark lines 50, resulting in low transmittance. An increase in the number of domains dividing the pixel region 40 further improves viewing angle characteristics, but also increases the area ratio of the dark lines 50 to the pixel region 40, thus resulting in even lower transmittance.

As described above, conventional liquid crystal display devices are not able to provide improved viewing angle characteristics and high transmittance at the same time. Yet, no means have been found to achieve the object. For example, in the inventions disclosed in WO 2012/108311 and Y. Yamada, et al., there is a room for improvement in terms of reduction of the dark lines described above to significantly increase the transmittance.

The present invention is made in view of the current situation described above, and aims to provide a liquid crystal display device having excellent viewing angle characteristics and high transmittance.

The present inventors made various studies on liquid crystal display devices having excellent viewing angle characteristics and high transmittance. As a result, they found that the dark lines are reduced by the use of a retardation layer having a specific in-plane phase difference in regions overlapping the boundaries between the domains. Thus, the inventors successfully achieved the above object and completed the present invention.

Specifically, according to an aspect, the present invention may provide a liquid crystal display device including in the stated order: a first polarizing plate; a first substrate; a first vertical alignment film; a liquid crystal layer containing liquid crystal molecules; a second vertical alignment film; a second substrate; and a second polarizing plate, wherein in a pixel region, the liquid crystal molecules are aligned vertically to a surface of the first vertical alignment film and a surface of the second vertical alignment film when no voltage is applied to the liquid crystal layer, and are aligned divisionally into at least four domains of mutually different tilt azimuths of the liquid crystal molecules when a voltage is applied to the liquid crystal layer, a first retardation layer containing a cured product of a first polymerizable liquid crystal compound is disposed between the first polarizing plate and the liquid crystal layer, a second retardation layer containing a cured product of a second polymerizable liquid crystal compound is disposed between the second polarizing plate and the liquid crystal layer, the first retardation layer includes a first area and a second area having mutually different in-plane phase differences, the second retardation layer includes a third area and a fourth area having mutually different in-plane phase differences, the first area and the third area overlap boundaries between the at least four domains in a plan view and each have an in-plane phase difference of 0.109 to 0.165 µm, an in-plane slow axis of the first area is orthogonal to an in-plane slow axis of the third area, an absorption axis of the first polarizing plate and the in-plane slow axis of the first area form an angle of substantially 45° therebetween, an absorption axis of the second polarizing plate and the in-plane slow axis of the third area form an angle of substantially 45° therebetween, and the absorption axis of the first polarizing plate is orthogonal to the absorption axis of the second polarizing plate.

The first retardation layer may be disposed between the first substrate and the first vertical alignment film.

A first horizontal alignment film may be disposed between the first substrate and the first retardation layer.

The second retardation layer may be disposed between the second substrate and the second vertical alignment film.

A second horizontal alignment film may be disposed between the second substrate and the second retardation layer.

The second area and the fourth area may not have an in-plane phase difference.

The at least four domains may include four domains arranged in a matrix of two rows and two columns, and the first area and the third area may be cross-shaped in a plan view.

When the azimuth of the absorption axis of the first polarizing plate is defined as 0° and the anticlockwise direction is defined as positive, the four domains may include a domain in which the tilt azimuth is substantially 45°, a domain in which the tilt azimuth is substantially 135°, a domain in which the tilt azimuth is substantially 225°, and a domain in which the tilt azimuth is substantially 315°.

The present invention provides a liquid crystal display device having excellent viewing angle characteristics and high transmittance.

DETAILED DESCRIPTION OF THE INVENTION

Hereinafter, the present invention is described in more detail based on an embodiment with reference to the drawings. The embodiment, however, is not intended to limit the scope of the present invention. The features of the embodiment may appropriately be combined or modified within the spirit of the present invention.

Herein "X to Y" means "X or more and Y or less".

[Embodiment]

Figure 1:
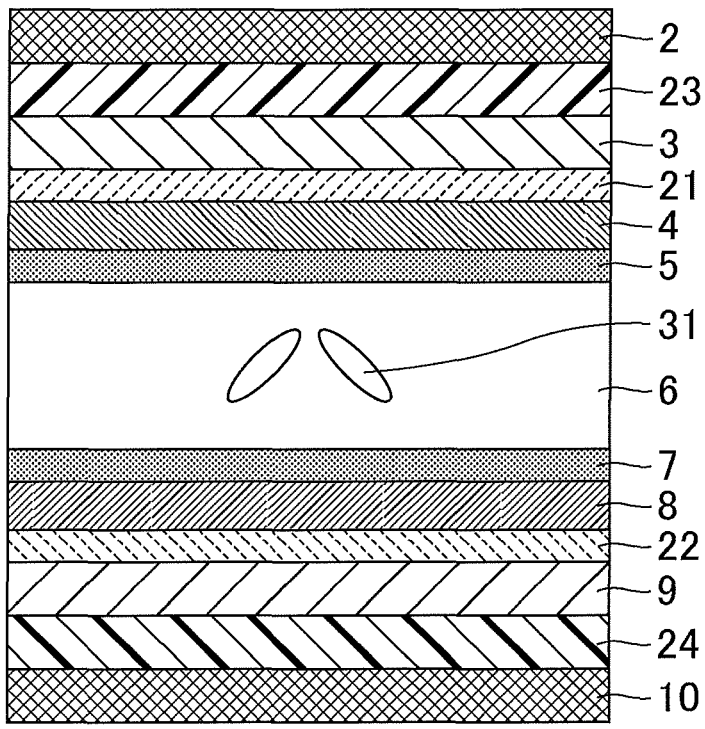
FIG. 1 is a schematic cross-sectional view showing a liquid crystal display device according to an embodiment.
Figure 2:
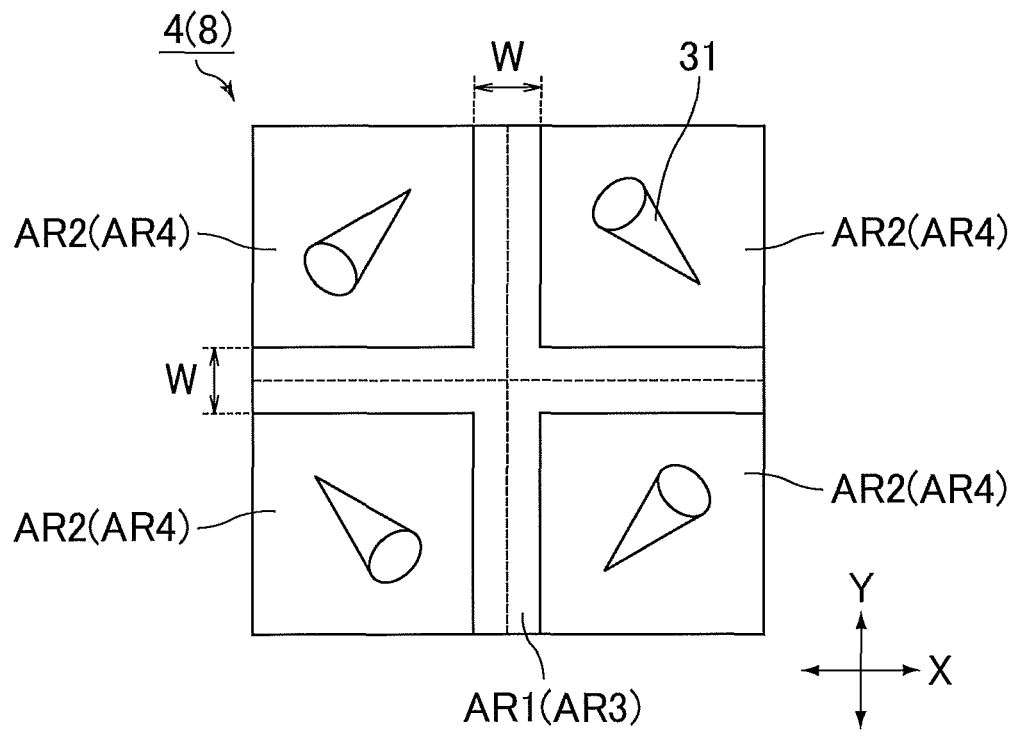
FIG. 2 is a schematic plan view showing a pixel region (when a voltage is applied) of the liquid crystal display device according to the embodiment.

A liquid crystal display device according to an embodiment is described below with reference to FIGS. 1 and 2. FIG. 1 is a schematic cross-sectional view showing the liquid crystal display device according to the embodiment. FIG. 2 is a schematic plan view showing a pixel region (when a voltage is applied) of the liquid crystal display device according to the embodiment.

As shown in FIG. 1, a liquid crystal display device 1 includes, in the stated order, a first polarizing plate 2, a first substrate 3, a first retardation layer 4, a first vertical alignment film 5, a liquid crystal layer 6, a second vertical alignment film 7, a second retardation layer 8, a second substrate 9, and a second polarizing plate 10.

In a pixel region, the liquid crystal molecules 31 in the liquid crystal layer 6 are aligned vertically to a surface of the first vertical alignment film 5 and a surface of the second vertical alignment film 7 when no voltage is applied to the liquid crystal layer 6 (when a voltage applied to the liquid crystal layer 6 is lower than the threshold voltage). Here, that the liquid crystal molecules 31 are aligned vertically to a surface of the first vertical alignment film 5 and a surface of the second vertical alignment film 7 means that the pre-tilt angle of the liquid crystal molecules 31 is 86° to 90° relative to the surface of the first vertical alignment film 5 and the surface of the second vertical alignment film 7. The pre-tilt angle is preferably 87° to 89°, more preferably 87.5° to 89°. The pre-tilt angle of the liquid crystal molecules 31 means an angle at which the major axis of each liquid crystal molecule 31 is tilted relative to the surface of the first vertical alignment film 5 and the surface of the second vertical alignment film 7 when no voltage is applied to the liquid crystal layer 6. The pre-tilt angle of the liquid crystal molecules 31 may affect the contrast ratio, AC afterimage, and the alignment properties of the liquid crystal molecules 31, for example. When the pre-tilt angle of the liquid crystal molecules 31 is 86° or more, the contrast ratio is sufficiently high. When the pre-tilt angle of the liquid crystal molecules 31 is 87.5° or more, the AC afterimage is sufficiently reduced. When the pre-tilt angle of the liquid crystal molecules 31 is 89° or less, the liquid crystal molecules 31 have sufficiently stable alignment properties (azimuth angle fluctuations of the liquid crystal molecules 31 are sufficiently reduced). According to this embodiment, the liquid crystal display device 1 having high transmittance can be provided without the need of reducing the pre-tilt angle of the liquid crystal molecules 31.

In a pixel region, the liquid crystal molecules 31 in the liquid crystal layer 6 are aligned divisionally into at least four domains of mutually different tilt azimuths of the liquid crystal molecules when a voltage is applied to the liquid crystal layer 6 (when the voltage applied to the liquid crystal layer 6 is equal to or higher than threshold voltage). FIG. 2 shows an example of the liquid crystal molecules 31 being aligned divisionally into four domains arranged in a matrix of two rows and two columns. Herein, the "pixel region" means the smallest display unit region. For example, it is a region that overlaps a single color filter layer (a color filter layer such as a red, green, or blue filter layer) or a region that overlaps a single pixel electrode. The tilt azimuths of the liquid crystal molecules 31 means directions (azimuths) of the liquid crystal molecules 31 when they are projected to the surface of the first vertical alignment film 5 or the second vertical alignment film 7. The tilt angle (polar angle) from the normal direction on the surface of the first vertical alignment film 5 or the second vertical alignment film 7 is not taken into consideration. FIG. 2 shows the liquid crystal molecules 31 each in a cone shape to facilitate understanding of the tilt azimuths of the liquid crystal molecules 31. The bottom of the cone is oriented toward the first substrate 3, and the apex of the cone is oriented toward the second substrate 9. In FIG. 2, a focus is placed on the liquid crystal molecules 31, the first retardation layer 4, and the second retardation layer 8 of the liquid crystal display device 1 when a voltage is applied. In FIG. 2, the X-axis direction corresponds to the azimuth of the absorption axis of the first polarizing plate 2, and the Y-axis direction corresponds to the azimuth of the absorption axis of the second polarizing plate 10.

<First Polarizing Plate and Second Polarizing Plate>

Examples of the first polarizing plate 2 and the second polarizing plate 10 include a polyvinyl alcohol (PVA) film stained or adsorbed with an anisotropic material such as an iodine complex (or a dye) and then stretched and aligned. Herein, the "polarizing plate" refers to a linearly polarizing plate (absorption-type polarizing plate) and is different from a circularly polarizing plate.

The absorption axis of the first polarizing plate 2 is orthogonal to the absorption axis of the second polarizing plate 10. Thus, the first polarizing plate 2 and the second polarizing plate 10 are arranged in crossed Nicols, enabling black display when no voltage is applied to the liquid crystal layer 6 and gray scale display (such as halftone display or white display) when a voltage is applied to the liquid crystal layer 6. Herein, that the two axes (directions) are orthogonal to each other means that an angle formed therebetween is 89° to 91°, preferably 89.5° to 90.5°.

<First Substrate>

The first substrate 3 may be a transparent substrate such as a glass substrate or a plastic substrate. The transparent substrate may be provided with members such as a color filter layer, a black matrix, and a common electrode on the side adjacent to the liquid crystal layer 6. These members (such as the color filter layer) may be disposed between the first substrate 3 and the first retardation layer 4, or between the first retardation layer 4 and the first vertical alignment film 5. The black matrix may have a grid pattern so as to divide the color filter layer. The common electrode may be in sheet form so as to cover the color filter layer and the black matrix.

Examples of materials of the color filter layer include pigment dispersion-type color resist. The combination of colors of the color filter layer is not particularly limited. Examples include a combination of red, green, and blue, and a combination of red, green, blue, and yellow.

Examples of materials of the black matrix include black resist.

Examples of materials of the common electrode include transparent conductive materials such as indium tin oxide (ITO) and indium zinc oxide (IZO).

<Second Substrate>

The second substrate 9 may be a transparent substrate such as a glass substrate or a plastic substrate. The transparent substrate may be provided with members such as gate lines, source lines, thin-film transistor elements, and pixel electrodes on the side adjacent to the liquid crystal layer 6. These members may be disposed between the second substrate 9 and the second retardation layer 8, or between the second retardation layer 8 and the second vertical alignment film 7. The gate lines may be orthogonal to the source lines. The thin-film transistor elements may each be disposed near each an intersection between a gate line and a source line. The pixel electrodes may be disposed in a matrix in an area divided by the gate lines and the source lines.

Examples of materials of the gate lines and the source lines include metal materials such as aluminum, copper, titanium, molybdenum, and chromium.

Examples of materials of a semiconductor layer (channel layer) constituting the thin-film transistor elements include amorphous silicon, polycrystalline silicon, and oxide semiconductors. In particular, oxide semiconductors are preferred in terms of low power consumption and high-speed driving. Oxide semiconductors enable low power consumption because the amount of off-leakage current (leakage current while the thin-film transistor element is turned off) is small, and also enable high-speed driving because the amount of on-state current (current while the thin-film transistor element is turned on) is large. Examples of the oxide semiconductors include a compound formed of indium, gallium, zinc, and, oxygen, and a compound formed of indium, tin, zinc, and oxygen.

Examples of the pixel electrodes include transparent conductive materials such as indium tin oxide (ITO) and indium zinc oxide (IZO).

In the structure as described above, application of a voltage between the common electrode and the pixel electrodes results in a vertical electric field in the liquid crystal layer 6, so that the alignment of the liquid crystal molecules 31 can be efficiently changed.

<First Retardation Layer and Second Retardation Layer>

The first retardation layer 4 contains a cured product of a first polymerizable liquid crystal compound. The second retardation layer 8 contains a cured product of a second polymerizable liquid crystal compound.

The first polymerizable liquid crystal compound and the second polymerizable liquid crystal compound are liquid crystal compounds containing a polymerizable functional group, and are preferably represented by the following formula (1) disclosed in Japanese Patent No. 5888480, for example:

$$P^1\text{-}(Sp^1)_{m1}\text{-}MG\text{-}R^1 \tag{1}$$

In the formula (1), $P^1$ represents a polymerizable functional group; $Sp^1$ represents a C0-C18 alkylene group; the alkylene group in $Sp^1$ may be substituted with at least one halogen atom, CN, or C1-C8 alkyl group having a polymerizable functional group; one $CH_2$ group or two or more non-adjacent $CH_2$ groups present in the alkylene group in $Sp^1$ may be each mutually independently substituted with —O—, —S—, —NH—, —N(CH$_3$)—, —CO—, —COO—, —OCO—, —OCOO—, —SCO—, —COS—, or —C≡C—, provided that oxygen atoms are not directly bonded to each other; and m1 represents 0 or 1.

In the formula (1), $R^1$ represents a hydrogen atom, a halogen atom, a cyano group, a C1-C18 alkyl group, or the following formula (1-1):

$$\text{-}(Sp^{1a})_{ma}\text{-}P^{1a} \tag{1-1}$$

wherein $Sp^{1a}$ means the same as the $Sp^1$; ma represents 0 or 1; and $P^{1a}$ represents a polymerizable functional group.

The alkyl group in $R^1$ may be substituted with at least one halogen atom or CN. One $CH_2$ group or two or more non-adjacent $CH_2$ groups present in the alkyl group in $R^1$ may be each mutually independently substituted with —O—, —S—, —NH—, —N(CH$_3$)—, —CO—, —COO—, —OCO—, —OCOO—, —SCO—, —COS—, or —C≡C—, provided that oxygen atoms are not directly bonded to each other.

In the formula (1), MG represents a mesogenic group or a mesogenic supporting group. The mesogenic group or mesogenic supporting group in MG is represented by the following formula (1-2):

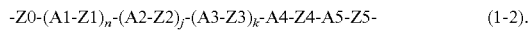

-Z0-(A1-Z1)$_n$-(A2-Z2)$_j$-(A3-Z3)$_k$-A4-Z4-A5-Z5-    (1-2).

In the formula (1-2), A1, A2, A3, A4, and A5 each independently represent a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a thiophene-2,5-diyl group, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, a 1,4-naphthylene group, a benzo[1,2-b:4,5-b']dithiophene-2,6-diyl group, a benzo[1,2-b:4,5-b']diselenophene-2,6-diyl group, a [1]benzothieno[3,2-b]thiophene-2,7-diyl group, a [1]benzoseleopheno[3,2-b]selenophene-2,7-diyl group, or a fluorene-2,7-diyl group. A1, A2, A3, A4, and A5 each independently may have, as a substituent, at least one F, Cl, CF$_3$, OCF$_3$, CN group, C1-C8 alkyl group, alkoxy group, alkanoyl group, alkanoyloxy group, C2-C8 alkenyl group, alkenyloxy group, alkenoyl group, or alkenoyloxy group, or at least one substituent represented by the following formula (1-3):

-(A)$_{n1}$-(Sp$^{1c}$)$_{mc}$-P$^c$    (1-3)

wherein A represents —O—, —COO—, —OCO—, —OCH$_2$—, —CH$_2$O—, —CH$_2$CH$_2$OCO—, —COOCH$_2$CH$_2$—, —OCOCH$_2$CH$_2$—, or a direct bond; n1 represents 0 or 1; Sp$^{1c}$ means the same as the Sp$^1$; mc represents 0 or 1; and P$^c$ represents a polymerizable functional group.

In the formula (1-2), Z0, Z1, Z2, Z3, Z4, and Z5 each independently represent —COO—, —OCO—, —CH$_2$CH$_2$—, —OCH$_2$—, —CH$_2$O—, —CH═CH—, —C≡C—, —CH═CHCOO—, —OCOCH═CH—, —CH$_2$CH$_2$COO—, —CH$_2$CH$_2$OCO—, —COOCH$_2$CH$_2$—, —OCOCH$_2$CH$_2$—, —CONH—, —NHCO—, a C2-C10 alkyl group optionally having a halogen atom, or a direct bond; and n, j, and k each independently represent 0 or 1 and satisfy 0≤n+j+k≤3.

The first retardation layer 4 is disposed between the first polarizing plate 2 and the liquid crystal layer 6. In order to achieve an in-cell arrangement, the first retardation layer 4 is preferably disposed between the first substrate 3 and the first vertical alignment film 5, as shown in FIG. 1. The second retardation layer 8 is disposed between the second polarizing plate 10 and the liquid crystal layer 6. In order to achieve an in-cell arrangement, the second retardation layer 8 is preferably disposed between the second substrate 9 and the second vertical alignment film 7, as shown in FIG. 1. In other words, preferably, the first retardation layer 4 is disposed between the first substrate 3 and the first vertical alignment film 5, and the second retardation layer 8 is disposed between the second substrate 9 and the second vertical alignment film 7.

As shown in FIG. 2, the first retardation layer 4 includes a first area AR1 and a second area AR2 having mutually different in-plane phase differences. The second retardation layer 8 includes a third area AR3 and a fourth area AR4 having mutually different in-plane phase differences.

The first area AR1 and the third area AR3 overlap the boundaries between the four domains (dotted line portions in FIG. 2) and are cross-shaped in a plan view. The shapes of the first area AR1 and the third area AR3 may be incongruent to each other in a plan view, but are preferably congruent to each other as shown in FIG. 2.

The first area AR1 and the third area AR3 each have an in-plane phase difference of 0.109 to 0.165 μm, preferably 0.124 to 0.138 μm. For example, when the in-plane phase difference is 0.1375 μm for light having a wavelength of 0.55 μm, the first retardation layer 4 functions as a λ/4 retardation layer in the first area AR1, and the second retardation layer 8 functions as a λ/4 retardation layer in the third area AR3. In the case where the in-plane phase difference is smaller than 0.109 μm, the viewing angle characteristics are significantly lower than those of conventional linear polarization mode liquid crystal display devices (e.g., a liquid crystal display device of Comparative Example 4 described later). When the in-plane phase difference is greater than 0.165 μm, the transmittance is significantly lower than that of conventional linear polarization mode liquid crystal display devices (e.g., the liquid crystal display device of Comparative Example 4 described later). The in-plane phase difference of the first area AR1 and the in-plane phase difference of the third area AR3 may be mutually different within the above range, but are preferably the same.

Herein, when the principal refractive indices of a retardation layer (retarder) in an in-plane direction are defined as nx and ny, the principal refractive index in the thickness direction is defined as nz, and the thickness is defined as D, an in-plane phase difference Re and a thickness-wise phase difference Rth are represented by the following formulas (A) and (B):

$$Re = |nx - ny| \times D \quad (A)$$

$$Rth = |(nx + ny)/2 - nz| \times D \quad (B).$$

An axis in a direction corresponding to a larger value between nx and ny is the in-plane slow axis, and an axis in a direction corresponding to a smaller value between nx and ny is the in-plane fast axis. The principal refractive indices indicate values for light having a wavelength of 0.55 μm, unless otherwise noted.

A cured product of the first polymerizable liquid crystal compound in the first retardation layer 4 is aligned in a specific direction in the first area AR1, preferably in the in-plane direction of the first retardation layer 4, in order to exhibit the in-plane phase difference described above. Here, that "a cured product of the first polymerizable liquid crystal compound is aligned in an in-plane direction of the first retardation layer 4" means that, in a cross-sectional view, the major axis of the cured product of the first polymerizable liquid crystal compound is tilted by an angle of 0° to 0.5° relative to the surface of the first retardation layer 4. The cured product of the first polymerizable liquid crystal compound may be aligned, for example, in a direction that forms an angle of 45° relative to the absorption axis of the first polarizing plate 2 in a plan view.

A cured product of the second polymerizable liquid crystal compound in the second retardation layer 8 is aligned in a specific direction in the third area AR3, preferably in an in-plane direction of the second retardation layer 8, in order to exhibit the in-plane phase difference described above. Here, that "a cured product of the second polymerizable liquid crystal compound is aligned in an in-plane direction of the second retardation layer 8" means that, in a cross-sectional view, the major axis of the cured product of the second polymerizable liquid crystal compound is tilted by an angle of 0° to 0.5° relative to the surface of the second retardation layer 8. The cured product of the second polymerizable liquid crystal compound may be aligned, for example, in a direction that forms an angle of 45° relative to the absorption axis of the second polarizing plate 10 in a plan view.

A first horizontal alignment film 21 shown in FIG. 1, for example, enables the cured product of the first polymerizable liquid crystal compound in the first retardation layer 4 to be efficiently imparted with alignment properties in the first area AR1. In other words, the first horizontal alignment film 21 is preferably disposed between the first substrate 3 and the first retardation layer 4. In addition, a second horizontal alignment film 22 shown in FIG. 1, for example, enables the cured product of the second polymerizable liquid crystal compound in the second retardation layer 8 to be efficiently imparted with alignment properties in the third area AR3. In other words, the second horizontal alignment film 22 is preferably disposed between the second substrate 9 and the second retardation layer 8. Thus, it is more preferred that the first horizontal alignment film 21 is disposed between the first substrate 3 and the first retardation layer 4 and that the second horizontal alignment film 22 is disposed between the second substrate 9 and the second retardation layer 8.

On the surface of the first horizontal alignment film 21, an area that overlaps at least the first area AR1 is preferably alignment-treated by, for example, photoalignment or rubbing. This enables the cured product of the first polymerizable liquid crystal compound to be efficiently aligned in the in-plane direction of the first retardation layer 4 in the first area AR1. In addition, on the surface of the second horizontal alignment film 22, an area that overlaps at least the third area AR3 is preferably alignment-treated by, for example, photoalignment or rubbing. This enables the cured product of the second polymerizable liquid crystal compound to be efficiently aligned in the in-plane direction of the second retardation layer 8 in the third area AR3.

The first horizontal alignment film 21 and the second horizontal alignment film 22 each may be a film formed of a compound selected from the group consisting of a polyimide, a polyamic acid, a polymaleimide, a polyamide, a polysiloxane, a polyphosphazene, a polysilsesquioxane, and a copolymer thereof (either a monolayer film or a multilayer film), or a film formed by oblique deposition of a silicon oxide. The surfaces of the first horizontal alignment film 21 and the second horizontal alignment film 22 may be alignment-treated by rubbing, for example.

Each of the first horizontal alignment film 21 and the second horizontal alignment film 22 may be a horizontal photoalignment film containing a photoreactive functional group. The photoreactive functional group is a functional group capable of exhibiting alignment controlling force through photoalignment treatment that applies light such as ultraviolet light or visible light. In other words, the photoreactive functional group can control alignment of the cured product of the first polymerizable liquid crystal compound and the cured product of the second polymerizable liquid crystal compound. The photoreactive functional group can induce photoreactions such as photodimerization, photoisomerization, photo Fries rearrangement, and photodissociation. Examples of the photoreactive functional group that induces photodimerization and photoisomerization include cinnamate, cinnamoyl, chalcone, coumarin, and stilbene groups. Examples of the photoreactive functional group that induces photoisomerization include an azobenzene group. Examples of the photoreactive functional group that induces photo Fries rearrangement include a phenol ester group. Examples of the photoreactive functional group that induces photodissociation include dianhydrides containing a cyclobutane ring such as 1,2,3,4-cyclobutanetetracarboxylic 1,2:3,4-dianhydride (CBDA).

As a means to impart alignment properties to the cured product of the first polymerizable liquid crystal compound and the cured product of the second polymerizable liquid crystal compound, for example, a member having a submicron-order uneven structure in one direction may be used, instead of the first horizontal alignment film 21 and the second horizontal alignment film 22.

The in-plane slow axis of the first area AR1 is orthogonal to the in-plane slow axis of the third area AR3. In addition, the absorption axis of the first polarizing plate 2 and the in-plane slow axis of the first area AR1 form an angle of substantially 45° therebetween. The absorption axis of the second polarizing plate 10 and the in-plane slow axis of the third area AR3 form an angle of substantially 45° therebetween. Herein, that the two axes (directions) form an angle of substantially 45° therebetween means that an angle formed therebetween is 44° to 46°, preferably 44.5° to 45.5°.

In the liquid crystal display device 1, the tilt azimuths of the liquid crystal molecules 31 are parallel to the azimuth of the absorption axis of the first polarizing plate 2 or the second polarizing plate 10 at the boundaries between the four domains. Here, in this embodiment, the first retardation layer 4 and the second retardation layer 8 are disposed on opposite sides of the liquid crystal layer 6 such that the first area AR1 of the first retardation layer 4 and the third area AR3 of the second retardation layer 8 overlap the boundaries between the four domains. Thus, in the areas overlapping the boundaries between the four domains, for example, linearly polarized light transmitted through the second polarizing plate 10 undergoes changes in the ellipticity in the third area AR3 and is converted into first elliptically polarized light before the light enters the liquid crystal layer 6. After the first elliptically polarized light is transmitted through the liquid crystal layer 6 (the boundaries between the four domains), the first elliptically polarized light undergoes changes in the ellipticity in the first area AR1 and is converted into second elliptically polarized light. Subsequently, the second elliptically polarized light reaches the first polarizing plate 2, and a component of linearly polarized light that vibrates in an azimuth parallel to the transmission axis of the first polarizing plate 2 (azimuth orthogonal to the absorption axis) is transmitted through the first polarizing plate 2. This increases the transmittance without any dark lines visible at the boundaries between the four domains. Further, since dark lines are not visible, excellent viewing angle characteristics based on an alignment division technique are achieved, and white blur in an oblique direction attributable to the difference between the transmittance in the normal direction and the transmittance in the oblique direction is reduced particularly from the halftone display to the white display. When the first area AR1 and the third area AR3 function as $\lambda/4$ retardation layers, the first elliptically polarized light is converted into circularly polarized light, and the second elliptically polarized light is converted into linearly polarized light that vibrates in the azimuth parallel to the transmission axis of the first polarizing plate 2 (azimuth orthogonal to the absorption axis). As described above, according to this embodiment, the liquid crystal display device 1 including the first retardation layer 4 and the second retardation layer 8 and capable of functioning in the linear polarization mode is achieved.

The thickness of the first retardation layer 4 and the thickness of the second retardation layer 8 are 0.8 to 1.2 μm when, for example, |nx−ny|=0.1375 in the first area AR1 and the third area AR3.

The second area AR2 and the fourth area AR4 preferably do not have an in-plane phase difference, i.e., these areas are preferably optically isotropic (isotropic layers). This results in a configuration which is optically equivalent to that of a conventional liquid crystal display device that employs an alignment division technique, in terms of light that is transmitted through the second area AR2 and the fourth area AR4. Thus, excellent viewing angle characteristics are achieved. Here, that the second area AR2 and the fourth area AR4 do not have an in-plane phase difference means that each of these areas has an in-plane phase difference of 0.01 μm or less.

<First Vertical Alignment Film and Second Vertical Alignment Film>

The first vertical alignment film 5 and the second vertical alignment film 7 function to align the liquid crystal molecules 31 in the liquid crystal layer 6 vertically to the surfaces of these films. The first vertical alignment film 5 and the second vertical alignment film 7 each may be a film formed of a compound selected from the group consisting of a polyimide, a polyamic acid, a polymaleimide, a polyamide, a polysiloxane, a polyphosphazene, a polysilsesquioxane, and a copolymer thereof (either a monolayer film or a multilayer film), or a film formed by oblique deposition of a silicon oxide. Each of the first vertical alignment film 5 and the second vertical alignment film 7 may be a vertical photoalignment film containing a photoreactive functional group.

<Liquid Crystal Layer>

Examples of materials of the liquid crystal layer 6 include negative liquid crystal materials having negative anisotropy of dielectric constant (Δε<0). Herein, the phase difference of the liquid crystal layer refers to the maximum value of the effective phase difference imparted by the liquid crystal layer, and it is expressed by Δn×d, where Δn is the refractive index anisotropy of the liquid crystal layer, and d is the thickness. The refractive index anisotropy of the liquid crystal layer indicates a value for light having a wavelength of 0.55 μm, unless otherwise noted.

When the azimuth of the absorption axis of the first polarizing plate 2 (X-axis direction in FIG. 2) is defined as 0° and the anticlockwise direction is defined as positive, as shown in FIG. 2, the four domains preferably include a domain in which the tilt azimuth of the liquid crystal molecules 31 is substantially 45°, a domain in which the tilt azimuth of the liquid crystal molecules 31 is substantially 135°, a domain in which the tilt azimuth of the liquid crystal molecules 31 is substantially 225°, and a domain in which the tilt azimuth of the liquid crystal molecules 31 is substantially 315°. This efficiently increases the transmittance. Here, that the tilt azimuths of the liquid crystal molecules 31 are substantially 45°, substantially 135°, substantially 225°, and substantially 315° means that the tilt azimuths are respectively 43° to 47°, 133° to 137°, 223° to 227°, and 313° to 317°, preferably 44° to 46°, 134° to 136°, 224° to 226°, and 314° to 316°.

In this embodiment, as shown in FIG. 1, the description is given on the structure including one first retardation layer 4 and one second retardation layer 8, but the structure may include multiple first retardation layers 4 and multiple second retardation layers 8. In other words, it suffices as long as at least one first retardation layer 4 and at least one second retardation layer 8 are disposed. When the multiple first retardation layers 4 are disposed, the first retardation layers 4 may be disposed not only in the position shown in FIG. 1 but also, for example, between the first polarizing plate 2 and the first substrate 3. When the multiple second retardation layers 8 are disposed, the second retardation layers 8 may be disposed not only in the position shown in FIG. 1 but also, for example, between the second polarizing plate 10 and the second substrate 9.

When the multiple first retardation layers 4 are disposed, the multiple first areas AR1 overlap each other in a plan view. The shapes of the first areas AR1 may be incongruent to each other in a plan view, but are preferably congruent to each other. When the multiple second retardation layers 8 are disposed, the multiple third areas AR3 overlap each other in a plan view. The shapes of the third areas AR3 may be incongruent to each other in a plan view, but are preferably congruent to each other.

When the multiple first retardation layers 4 are disposed, the sum of in-plane phase differences of the multiple first areas AR1 is 0.109 to 0.165 μm, preferably 0.124 to 0.138 μm. When the multiple second retardation layers 8 are disposed, the sum of in-plane phase differences of the multiple third areas AR3 is 0.109 to 0.165 μm, preferably 0.124 to 0.138 μm.

When the multiple first retardation layers 4 are disposed, the in-plane slow axes of the multiple first areas AR1 have the same azimuth. When the multiple second retardation layers 8 are disposed, the in-plane slow axes of the multiple third areas AR3 have the same azimuth. For example, when the multiple first retardation layers 4 and the multiple second retardation layers 8 are disposed, the in-plane slow axes of the multiple first areas AR1 are orthogonal to the in-plane slow axes of the multiple third areas AR3. The absorption axis of the first polarizing plate 2 and the in-plane slow axes of the first areas AR1 form an angle of substantially 45° therebetween. The absorption axis of the second polarizing plate 10 and the in-plane slow axis of the third areas AR3 form an angle of substantially 45° therebetween.

In this embodiment, as shown in FIG. 2, the description is given on the state in which the liquid crystal molecules 31 in the liquid crystal layer 6 are aligned divisionally into four domains when a voltage is applied to the liquid crystal layer 6. Yet, the number of domains into which the liquid crystal molecules 31 are aligned divisionally is not particularly limited as long as it is at least four. In addition, in FIG. 2, the four domains are arranged in a matrix of two rows and two columns, but the arrangement is not particularly limited. For example, the four domains may be arranged in a matrix of one row and four columns.

The liquid crystal display device 1 may further include a retardation layer other than the first retardation layer(s) 4 and the second retardation layer(s) 8. For example, as shown in FIG. 1, a first biaxial retarder 23 may be disposed between the first polarizing plate 2 and the first substrate 3, and a second biaxial retarder 24 may be disposed between the second polarizing plate 10 and the second substrate 9. The first biaxial retarder 23 and the second biaxial retarder 24 each have principal refractive indices satisfying the following formula: nx>ny>nz, or nx<ny<nz. The first biaxial retarder 23 and the second biaxial retarder 24 are disposed for the purpose of optimizing changes (optical compensation) in the polarization state in the oblique direction during black display (when no voltage is applied to the liquid crystal layer 6). As a result, these retarders contribute to the reduction of white blur in the oblique direction. In this embodiment, the first biaxial retarder 23 and the second biaxial retarder 24 each have a uniform phase difference (i.e., these retarders do not include any area having a different in-plane phase difference), and thus do not correspond to the first retardation layer 4 or the second retardation layer 8.

The liquid crystal display device 1 may further contain a backlight unit behind the second polarizing plate 10 on the side opposite to the second substrate 9. In this case, the liquid crystal display device 1 is a transmissive liquid crystal display device. The mode of the backlight unit is not particularly limited. Examples include an edge-light backlight unit and a direct-light backlight unit. The type of light sources of the backlight unit is not particularly limited. Examples include light emitting diodes (LEDs) and cold cathode fluorescent lamps (CCFLs).

The liquid crystal display device 1 may further include a member commonly used in the field of liquid crystal display devices, in addition to the members described above. For example, the liquid crystal display device 1 may include an external circuit such as a tape carried package (TCP) and a printed circuit board (PCB), and a bezel (frame), as appropriate.

The liquid crystal display device 1 may be produced by the following method, for example.

<Formation of First Horizontal Alignment Film and Second Horizontal Alignment Film>

A horizontal alignment film material is applied to the surface of the first substrate 3 and the surface of the second substrate 9. The horizontal alignment film material may be, for example, a horizontal photoalignment film material containing an azobenzene polymer. A spin coater, for example, may be used to apply the horizontal alignment film material. At this time, the rotational speed of the spin coater may be 1500 rpm, for example.

Next, the coating film of the horizontal alignment film material is pre-baked (for example, baking at 80° C. for one minute) and is then post-baked (for example, baking at 200° C.). As a result, the first horizontal alignment film 21 is formed on the surface of the first substrate 3, and the second horizontal alignment film 22 is formed on the surface of the second substrate 9. The thickness of the first horizontal alignment film 21 and the thickness of the second horizontal alignment film 22 are preferably 85 to 115 nm after post-baking.

Next, alignment treatment is performed on an area of the first horizontal alignment film 21, where the cured product of the first polymerizable liquid crystal compound in the first retardation layer 4 (which is formed later) is intended to be imparted with predetermined alignment properties. For example, when the first horizontal alignment film 21 is a horizontal photoalignment film, photoalignment treatment that applies light such as ultraviolet light or visible light may be performed on the first horizontal alignment film 21, with the first horizontal alignment film 21 being partially shielded from light with a light-shielding mask. As a result, in the first horizontal alignment film 21, the area not covered with the light-shielding mask exhibits predetermined horizontal alignment properties (uniaxial alignment properties) and the area covered with the light-shielding mask does not exhibit horizontal alignment properties. The area of the first horizontal alignment film 21 to be in contact with the light-shielding mask is preferably an area that overlaps the second area AR2 of the first retardation layer 4 (which is formed later). Light to be applied to the first horizontal alignment film 21 may be, for example, ultraviolet light from a high-pressure mercury lamp. At this time, ultraviolet light to be applied may be, for example, polarized ultraviolet light having a center wavelength of 365 nm with a dose of 1000 mJ/cm$^2$.

Meanwhile, alignment treatment is performed on an area of the second horizontal alignment film 22, where the cured product of the second polymerizable liquid crystal compound in the second retardation layer 8 (which is formed later) is intended to be imparted with predetermined alignment properties. For example, when the second horizontal alignment film 22 is a horizontal photoalignment film, photoalignment treatment that applies light such as ultraviolet light or visible light may be performed on the second horizontal alignment film 22, with the second horizontal alignment film 22 being partially shielded from light with a light-shielding mask. As a result, in the second horizontal alignment film 22, the area not covered with the light-shielding mask exhibits predetermined horizontal alignment properties (uniaxial alignment properties) and the area covered with the light-shielding mask does not exhibit horizontal alignment properties. The area of the second horizontal alignment film 22 to be in contact with the light-shielding mask is preferably an area that overlaps the fourth area AR4 of the second retardation layer 8 (which is formed later). Light to be applied to the second horizontal alignment film 22 may be, for example, ultraviolet light from a high-pressure mercury lamp. At this time, ultraviolet light to be applied may be, for example, polarized ultraviolet light having a center wavelength of 365 nm with a dose of 1000 mJ/cm$^2$.

<Formation of First Retardation Layer and Second Retardation Layer>

A first polymerizable liquid crystal composition containing the first polymerizable liquid crystal compound and a second polymerizable liquid crystal composition containing the second polymerizable liquid crystal compound are prepared. The first polymerizable liquid crystal compound and the second polymerizable liquid crystal compound may be, for example, liquid crystal compounds having a nematic-isotropic phase transition temperature of 70° C. and a dielectric constant anisotropy of 5. The first polymerizable liquid crystal composition and the second polymerizable liquid crystal composition may contain organic solvents such as propylene glycol monomethyl ether acetate (PG-MEA). A stirring device equipped with a stirring propeller, for example, may be used to prepare the first polymerizable liquid crystal composition and the second polymerizable liquid crystal composition. At this time, the stirring speed of the stirring device may be 500 rpm, the stirring time may be one hour, and the stirring temperature may be 60° C.

Next, the first polymerizable liquid crystal composition is applied to the surface of the first horizontal alignment film 21, and the second polymerizable liquid crystal composition is applied to the surface of the second horizontal alignment film 22. A spin coater, for example, may be used to apply the first polymerizable liquid crystal composition and the second polymerizable liquid crystal composition.

Next, light such as ultraviolet light or visible light is applied to the coating films of the first polymerizable liquid crystal composition and the second polymerizable liquid crystal composition. As a result, the first polymerizable liquid crystal compound is polymerized, whereby the first retardation layer 4 is formed on the surface of the first horizontal alignment film 21; and the second polymerizable liquid crystal compound is polymerized, whereby the second retardation layer 8 is formed on the surface of the second horizontal alignment film 22.

The first area AR1 and the second area AR2 having mutually different in-plane phase differences are formed on the first retardation layer 4, due to the effect of the first horizontal alignment film 21. For example, when the first horizontal alignment film 21 is subjected to photoalignment treatment using a light-shielding mask as described above, the cured product of the first polymerizable liquid crystal compound is imparted with horizontal alignment properties (uniaxial alignment properties) in the first area AR1, whereas the cured product of the first polymerizable liquid crystal compound is not imparted with alignment properties in the second area AR2 and the second area AR2 is thus optically isotropic. As a result, the first area AR1 has a predetermined in-plane phase difference, whereas the second area AR2 does not have an in-plane phase difference. The in-plane phase difference of the first area AR1 is determined by the product of the refractive index anisotropy of the cured product of the first polymerizable liquid crystal compound and the thickness of the first area AR1 of the first retardation layer 4.

Meanwhile, the third area AR3 and the fourth area AR4 having mutually different in-plane phase differences are formed on the second retardation layer 8, due to the effect of the second horizontal alignment film 22. For example, when the second horizontal alignment film 22 is subjected to photoalignment treatment using a light-shielding mask as described above, the cured product of the second polymerizable liquid crystal compound is imparted with horizontal alignment properties (uniaxial alignment properties) in the third area AR3, whereas the cured product of the second polymerizable liquid crystal compound is not imparted with alignment properties in the fourth area AR4 and the fourth area AR4 is thus optically isotropic. As a result, the third area AR3 has a predetermined in-plane phase difference, whereas the fourth area AR4 does not have an in-plane phase difference. The in-plane phase difference of the third area AR3 is determined by the product of the refractive index anisotropy of the cured product of the second polymerizable liquid crystal compound and the thickness of the third area AR3 of the second retardation layer 8.

<Formation of First Vertical Alignment Film and Second Vertical Alignment Film>

A vertical alignment film material is applied to the surfaces of the first retardation layer 4 and the second retardation layer 8. The vertical alignment film material may be, for example, a cinnamate group-containing vertical photoalignment film material containing a polyamic acid and a soluble polyimide as main chains. A spin coater, for example, may be used to apply the vertical alignment film material. At this time, the rotational speed of the spin coater may be 2000 rpm, for example.

Next, the coating film of the vertical alignment film material is pre-baked (for example, baking at 80° C. for one minute) and is then post-baked (for example, baking at 200° C. to 230° C. for one hour). As a result, the first vertical alignment film 5 is formed on the surface of the first retardation layer 4, and the second vertical alignment film 7 is formed on the surface of the second retardation layer 8. The thickness of the first vertical alignment film 5 and the thickness of the second vertical alignment film 7 are preferably 85 to 110 nm after post-baking.

Next, the first vertical alignment film 5 and the second vertical alignment film 7 are subjected to alignment division treatment that divides the pixel region into multiple domains. For example, when the first vertical alignment film 5 and the second vertical alignment film 7 are vertical photoalignment films, photoalignment treatment that applies light such as ultraviolet light or visible light may be performed repeatedly on the first vertical alignment film 5 and the second vertical alignment film 7, with these films being partially shielded from light with light-shielding masks, while the shielded portions and the irradiation angle are varied. When the photoalignment treatment is performed through application of ultraviolet light, the ultraviolet light to be applied may be, for example, polarized ultraviolet light having a center wavelength of 313 nm with a dose of 50 mJ/cm$^2$.

<Completion of Liquid Crystal Display Device>

Lastly, the first substrate 3 and the second substrate 9 are bonded to each other with a sealing material so as to sandwich the liquid crystal layer 6 therebetween. Subsequently, components such as the first polarizing plate 2, the second polarizing plate 10, the first biaxial retarder 23, and the second biaxial retarder 24 are disposed, whereby the liquid crystal display device 1 shown in FIG. 1 is completed. Here, the liquid crystal molecules 31 in the liquid crystal layer 6 are aligned vertically to the surface of the first vertical alignment film 5 and the second vertical alignment film 7 when no voltage is applied to the liquid crystal layer 6, and aligned divisionally into at least four domains (four domains in FIG. 2) of mutually different tilt azimuths of the liquid crystal molecules 31 when a voltage is applied to the liquid crystal layer 6. In addition, the first area AR1 of the first retardation layer 4 and the third area AR3 of the second retardation layer 8 overlap the boundaries between at least four domains in a plan view.

EXAMPLES AND COMPARATIVE EXAMPLES

The transmittance and viewing angle characteristics of the liquid crystal display devices are described below based on the simulation results, with reference to examples and comparative examples. The present invention is not limited to these examples.

In each example, the azimuth of the absorption axis of the first polarizing plate is defined as 0° and the anticlockwise direction is defined as positive to indicate the azimuth of the absorption axis of the polarizing plate, the azimuth of the in-plane slow axis of the retardation layer (retarder), and the tilt azimuths of the liquid crystal molecules.

Example 1

A liquid crystal display device of Example 1 was the liquid crystal display device according to the embodiment described above with reference of FIGS. 1 and 2.

Simulation parameters for constituent members of the liquid crystal display device of Example 1 were set as follows. The pixel region size was set to 62 μm×62 μm. The width of each of the first area of the first retardation layer and the third area of the second retardation layer corresponds to the width W in FIG. 2.

<First Polarizing Plate>

Thickness: 180 μm

Azimuth of absorption axis: 0°

<First Biaxial Retarder>
Thickness: 56 μm
nx: 1.49122
ny: 1.49024
nz: 1.48854
Re: 0.05488 μm
Rth: 0.12264 μm
Azimuth of in-plane slow axis: 90°
<First Retardation Layer>
(First Area)
Thickness: 0.7971 μm
Width: 10 μm
nx: 1.5000
ny: 1.6375
nz: 0
Re: 0.1096 μm
Azimuth of in-plane slow axis: 45°
(Second Area)
Thickness: 0.7971 μm
Re: 0 μm (isotropic layer)
<Liquid Crystal Layer>
Thickness: 3.0 μm
Δn: 0.107
Phase difference: 0.321 μm
Tilt azimuths of liquid crystal molecules: 45°, 135°, 225°, and 315° (four domains)
<Second Retardation Layer>
(Third Area)
Thickness: 0.7971 μm
Width: 10 μm
nx: 1.5000
ny: 1.6375
nz: 0
Re: 0.1096 μm
Azimuth of in-plane slow axis: −45°
(Fourth Area)
Thickness: 0.7971 μm
Re: 0 μm (isotropic layer)
<Second Biaxial Retarder>
Thickness: 56 μm
nx: 1.49122
ny: 1.49024
nz: 1.48854
Re: 0.05488 μm
Rth: 0.12264 μm
Azimuth of in-plane slow axis: 0°
<Second Polarizing Plate>
Thickness: 180 μm
Azimuth of absorption axis: 90°

Example 2

A liquid crystal display device of Example 2 was the same as the liquid crystal display device of Example 1 except that the simulation parameters of the first retardation layer and the second retardation layer were changed as follows.
<First Retardation Layer>
(First Area)
Thickness: 0.9964 μm
Width: 10 μm
nx: 1.5000
ny: 1.6375
nz: 0
Re: 0.1370 μm
Azimuth of in-plane slow axis: 45°
(Second Area)
Thickness: 0.9964 μm
Re: 0 μm (isotropic layer)
<Second Retardation Layer>
(Third Area)
Thickness: 0.9964 μm
Width: 10 μm
nx: 1.5000
ny: 1.6375
nz: 0
Re: 0.1370 μm
Azimuth of in-plane slow axis: −45°
(Fourth Area)
Thickness: 0.9964 μm
Re: 0 μm (isotropic layer)

Example 3

A liquid crystal display device of Example 3 was the same as the liquid crystal display device of Example 1 except that the simulation parameters of the first retardation layer and the second retardation layer were changed as follows.
<First Retardation Layer>
(First Area)
Thickness: 1.196 μm
Width: 10 μm
nx: 1.5000
ny: 1.6375
nz: 0
Re: 0.1644 μm
Azimuth of in-plane slow axis: 45°
(Second Area)
Thickness: 1.196 μm
Re: 0 μm (isotropic layer)
<Second Retardation Layer>
(Third Area)
Thickness: 1.196 μm
Width: 10 μm
nx: 1.5000
ny: 1.6375
nz: 0
Re: 0.1644 μm
Azimuth of in-plane slow axis: −45°
(Fourth Area)
Thickness: 1.196 μm
Re: 0 μm (isotropic layer)

Comparative Example 1

A liquid crystal display device of Comparative Example 1 was the same as the liquid crystal display device of Example 1 except that the simulation parameters of the first retardation layer and the second retardation layer were changed as follows.
<First Retardation Layer>
(First Area)
Thickness: 0.2989 μm
Width: 10 μm
nx: 1.5000
ny: 1.6375
nz: 0
Re: 0.0411 μm
Azimuth of in-plane slow axis: 45°
(Second Area)
Thickness: 0.2989 μm
Re: 0 μm (isotropic layer)
<Second Retardation Layer>
(Third Area)
Thickness: 0.2989 μm Width: 10 μm
nx: 1.5000
ny: 1.6375
nz: 0
Re: 0.0411 μm
Azimuth of in-plane slow axis: −45°
(Fourth Area)
Thickness: 0.2989 μm
Re: 0 μm (isotropic layer)

Comparative Example 2

A liquid crystal display device of Comparative Example 2 was the same as the liquid crystal display device of Example 1 except that the simulation parameters of the first retardation layer and the second retardation layer were changed as follows.
<First Retardation Layer>
(First Area)
Thickness: 0.4982 μm
Width: 10 μm
nx: 1.5000
ny: 1.6375
nz: 0
Re: 0.0685 μm
Azimuth of in-plane slow axis: 45°
(Second Area)
Thickness: 0.4982 μm
Re: 0 μm (isotropic layer)
<Second Retardation Layer>
(Third Area)
Thickness: 0.4982 μm
Width: 10 μm
nx: 1.5000
ny: 1.6375
nz: 0
Re: 0.0685 μm
Azimuth of in-plane slow axis: −45°
(Fourth Area)
Thickness: 0.4982 μm
Re: 0 μm (isotropic layer)

Comparative Example 3

A liquid crystal display device of Comparative Example 3 was the same as the liquid crystal display device of Example 1 except that the simulation parameters of the first retardation layer and the second retardation layer were changed as follows.
<First Retardation Layer>
(First Area)
Thickness: 1.395 μm
Width: 10 μm
nx: 1.5000
ny: 1.6375
nz: 0
Re: 0.1918 μm
Azimuth of in-plane slow axis: 45°
(Second Area)
Thickness: 1.395 μm
Re: 0 μm (isotropic layer)
<Second Retardation Layer>
(Third Area)
Thickness: 1.395 μm
Width: 10 μm
nx: 1.5000
ny: 1.6375
nz: 0
Re: 0.1918 μm
Azimuth of in-plane slow axis: −45°
(Fourth Area)
Thickness: 1.395 μm
Re: 0 μm (isotropic layer)

Comparative Example 4

Figure 3:
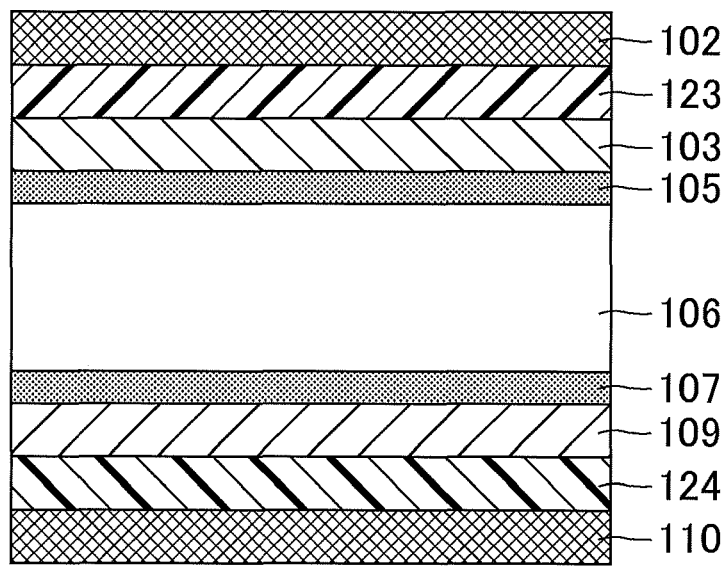
FIG. 3 is a schematic cross-sectional view showing a liquid crystal display device of Comparative Example 4.

FIG. 3 is a schematic cross-sectional view showing a liquid crystal display device of Comparative Example 4. As shown in FIG. 3, a liquid crystal display device 101a includes, in the stated order, a first polarizing plate 102, a first biaxial retarder 123, a first substrate 103, a first vertical alignment film 105, a liquid crystal layer 106, a second vertical alignment film 107, a second substrate 109, a second biaxial retarder 124, and a second polarizing plate 110. The liquid crystal display device 101a corresponds to a conventional linear polarization mode liquid crystal display device that employs an alignment division technique. Simulation parameters for the liquid crystal display device of Comparative Example 4 were set as follows.
<First Polarizing Plate>
Thickness: 180 μm
Azimuth of absorption axis: 0°
<First Biaxial Retarder>
Thickness: 56 μm
nx: 1.49122
ny: 1.49024
nz: 1.48854
Re: 0.05488 μm
Rth: 0.12264 μm
Azimuth of in-plane slow axis: 90°
<Liquid Crystal Layer>
Thickness: 3.0 μm
Δn: 0.107
Phase difference: 0.321 μm
Tilt azimuths of liquid crystal molecules: 45°, 135°, 225°, and 315° (four domains)
<Second Biaxial Retarder>
Thickness: 56 μm
nx: 1.49122
ny: 1.49024
nz: 1.48854
Re: 0.05488 μm
Rth: 0.12264 μm
Azimuth of in-plane slow axis: 0°
<Second Polarizing Plate>
Thickness: 180 μm
Azimuth of absorption axis: 90°

Comparative Example 5

Figure 4:
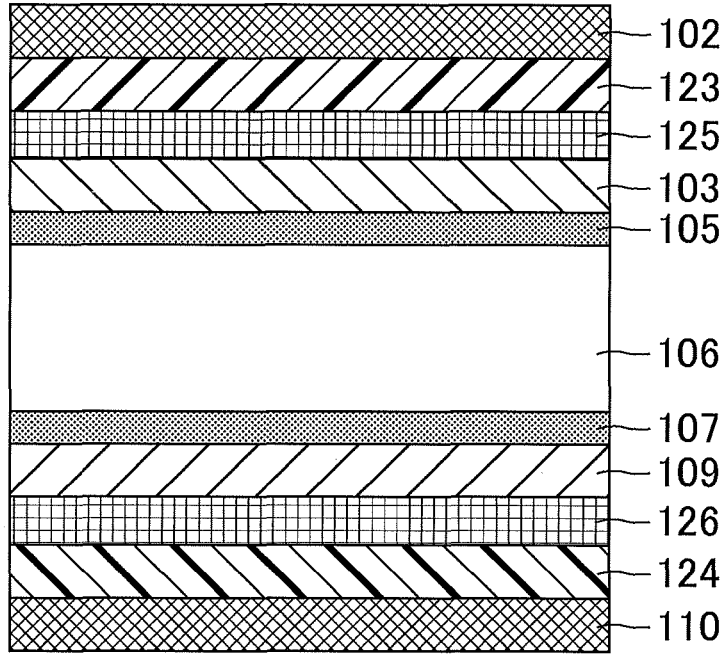
FIG. 4 is a schematic cross-sectional view showing a liquid crystal display device of Comparative Example 5.

FIG. 4 is a schematic cross-sectional view showing a liquid crystal display device of Comparative Example 5. As shown in FIG. 4, a liquid crystal display device 101b includes, in the states order, a first polarizing plate 102, a first biaxial retarder 123, a first λ/4 plate 125, a first substrate 103, a first vertical alignment film 105, a liquid crystal layer 106, a second vertical alignment film 107, a second substrate 109, a second λ/4 plate 126, a second biaxial retarder 124, and a second polarizing plate 110. The liquid crystal display device 101b corresponds to a conventional circular polarization mode liquid crystal display device that employs an alignment division technique. Simulation parameters for constituent members of the liquid crystal display device of Comparative Example 5 were set as follows.

<First Polarizing Plate>
Thickness: 180 μm
Azimuth of absorption axis: 0°
<First Biaxial Retarder>
Thickness: 56 μm
nx: 1.49122
ny: 1.49024
nz: 1.48854
Re: 0.05488 μm
Rth: 0.12264 μm
Azimuth of in-plane slow axis: 90°
<First λ/4 Plate>
Thickness: 100 μm
nx: 1.5000
ny: 1.501375
nz: 0
Re: 0.1375 μm
Azimuth of in-plane slow axis: 45°
<Liquid Crystal Layer>
Thickness: 3.0 μm
Δn: 0.107
Phase difference: 0.321 μm
Tilt azimuths of liquid crystal molecules: 45°, 135°, 225°, and 315° (four domains)
<Second λ/4 Plate>
Thickness: 100 μm
nx: 1.5000
ny: 1.501375
nz: 0
Re: 0.1375 μm
Azimuth of in-plane slow axis: −45°
<Second Biaxial Retarder>
Thickness: 56 μm
nx: 1.49122
ny: 1.49024
nz: 1.48854
Re: 0.05488 μm
Rth: 0.12264 μm
Azimuth of in-plane slow axis: 0°
<Second Polarizing Plate>
Thickness: 180 μm
Azimuth of absorption axis: 90°
[Evaluation 1]

Figure 5:
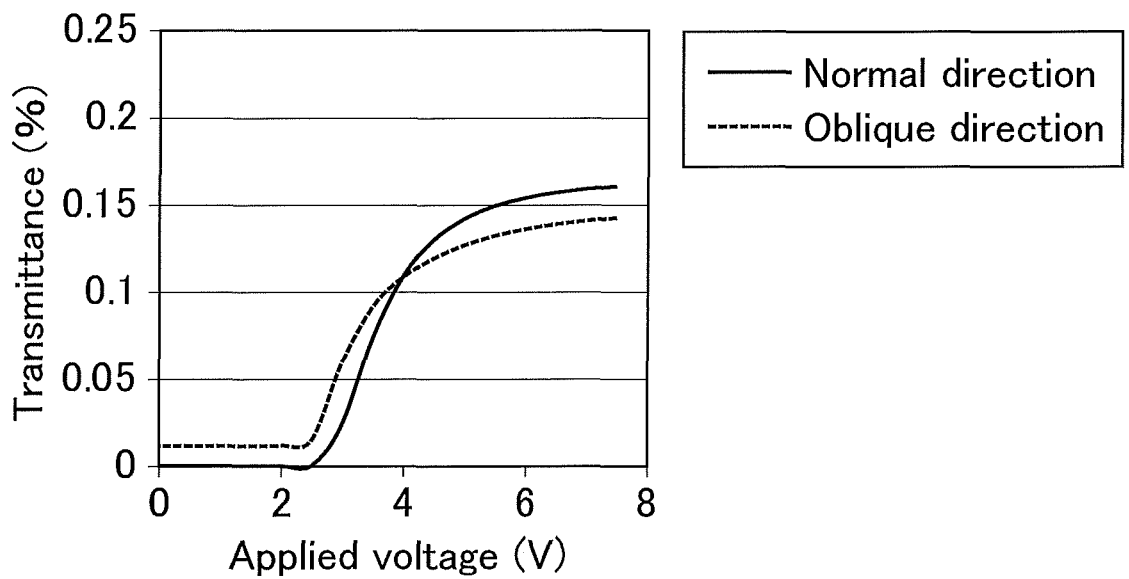
FIG. 5 is a graph showing transmittance characteristics simulation results of a liquid crystal display device of Example 2.
Figure 6:
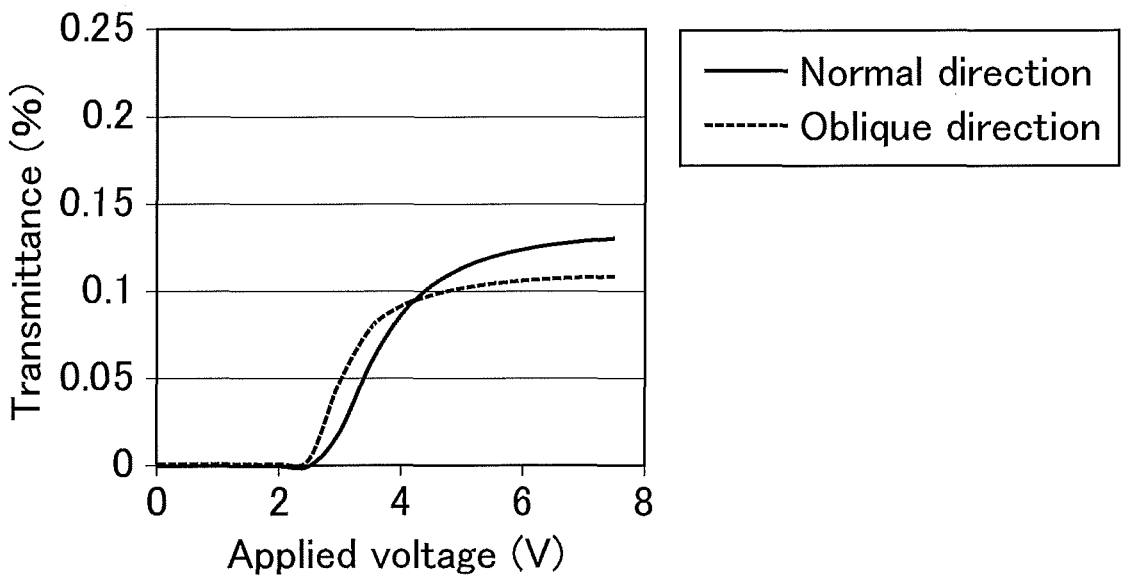
FIG. 6 is a graph showing transmittance characteristics simulation results of the liquid crystal display device of Comparative Example 4.
Figure 7:
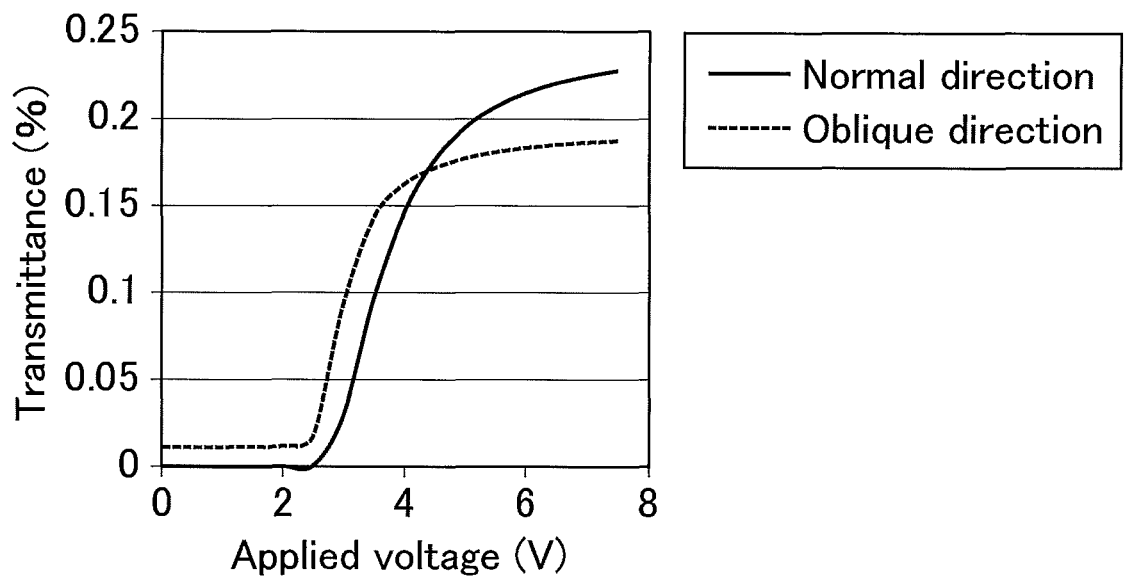
FIG. 7 is a graph showing transmittance characteristics simulation results of the liquid crystal display device of Comparative Example 5.

For the liquid crystal display devices of Examples 1 to 3 and Comparative Examples 1 to 5, the transmittance characteristics (relationship between transmittance and applied voltage) in the normal direction and the oblique direction (a direction at a polar angle of 60° and an azimuth angle of 45°) were simulated using "LCD Master 3D" available from Shintech, Inc. FIGS. 5 to 7 represent the simulation results of the liquid crystal display devices of Example 2, Comparative Example 4, and Comparative Example 5. FIG. 5 is a graph showing the transmittance characteristics simulation results of the liquid crystal display device of Example 2. FIG. 6 is a graph showing the transmittance characteristics simulation results of the liquid crystal display device of Comparative Example 4. FIG. 7 is a graph showing the transmittance characteristics simulation results of the liquid crystal display device of Comparative Example 5. It was assumed that the black state was displayed when the applied voltage was 0 V, and the white state was displayed when the applied voltage was 7.5 V.

Next, the following evaluations were made based on the transmittance characteristics simulation results of the liquid crystal display devices of the examples.

Figure 8:
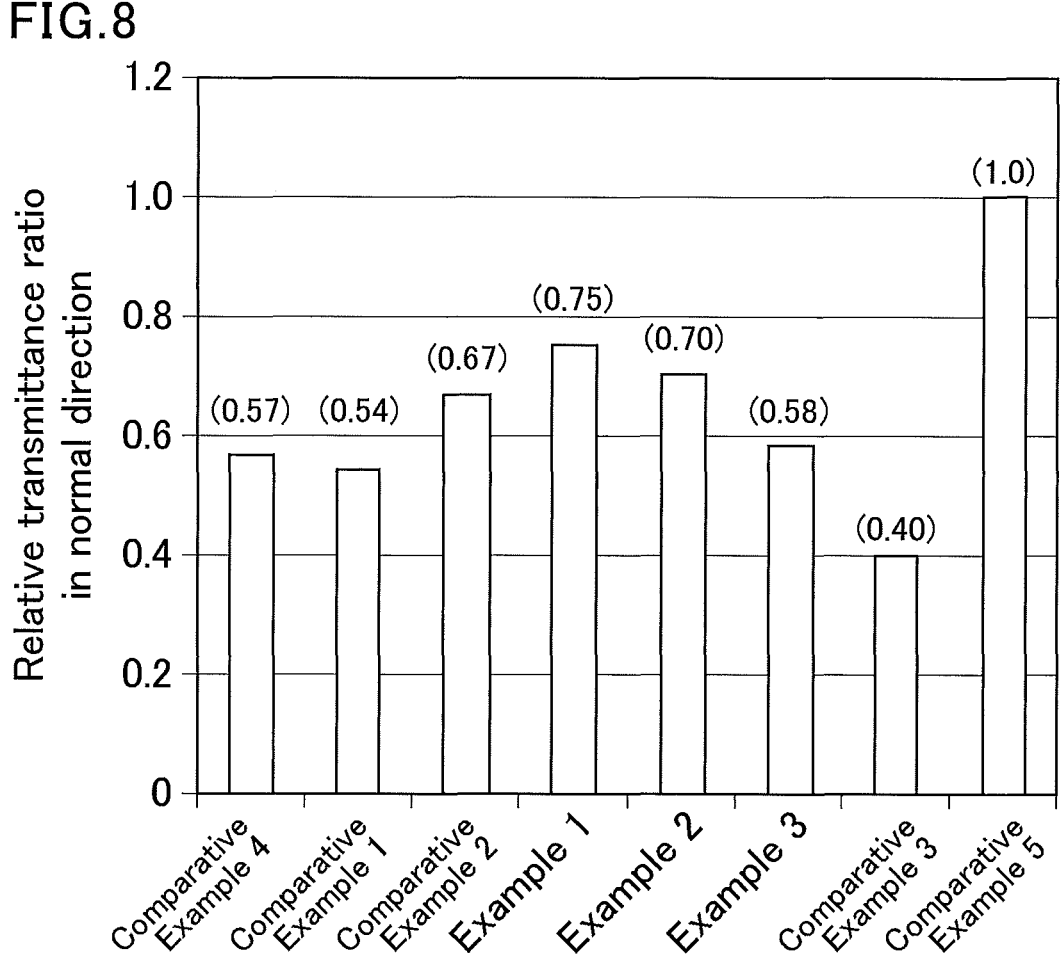
FIG. 8 is a graph showing relative transmittance ratios in the normal direction of liquid crystal display devices of Examples 1 to 3 and Comparative Examples 1 to 5.

<Comparison of Transmittance>
FIG. 8 is a graph showing relative transmittance ratios in the normal direction of the liquid crystal display devices of Examples 1 to 3 and Comparative Examples 1 to 5. The title "Relative transmittance ratio in normal direction" of the vertical axis in FIG. 8 indicates the transmittance in the normal direction of the liquid crystal display device of each example, which was normalized using the transmittance in the normal direction of the liquid crystal display device of Comparative Example 5 as the standard (1.0) when the applied voltage was 7.5 V.

Figure 9:
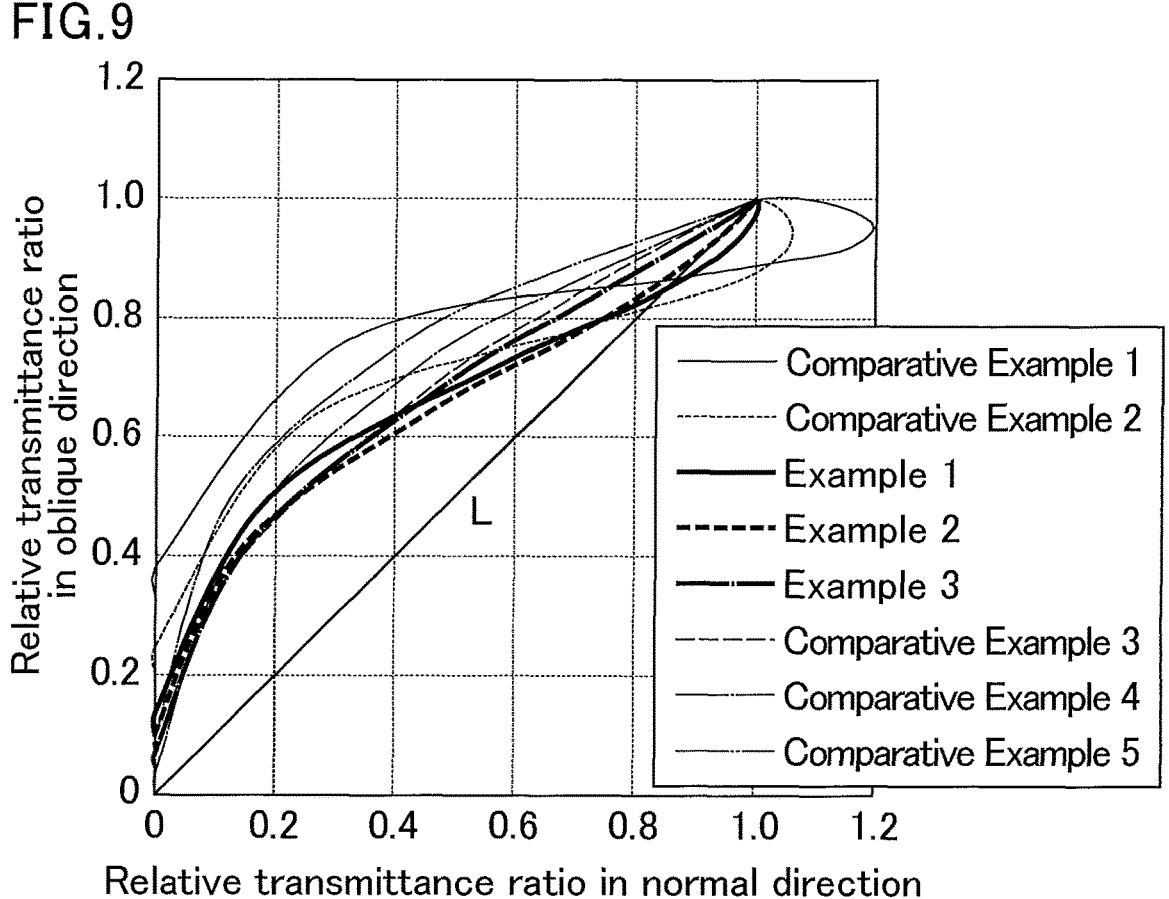
FIG. 9 is a graph showing viewing angle characteristics of the liquid crystal display devices of Examples 1 to 3 and Comparative Examples 1 to 5.

<Comparison of Viewing Angle Characteristics>
FIG. 9 is a graph showing viewing angle characteristics of the liquid crystal display devices of Examples 1 to 3 and Comparative Examples 1 to 5. The title "Relative transmittance ratio in oblique direction" of the vertical axis in FIG. 9 indicates the transmittance in the oblique direction corresponding to each applied voltage, which was normalized using the transmittance in the oblique direction as the standard (1.0) when the applied voltage was 7.5 V. The title "Relative transmittance ratio in normal direction" of the horizontal axis in FIG. 9 indicates the transmittance in the normal direction corresponding to each applied voltage, which was normalized using the transmittance in the normal direction as the standard (1.0) when the applied voltage was 7.5 V. A straight line L in FIG. 9 corresponds to the case where the transmittance characteristics (relationship between transmittance and applied voltage) exhibit the same tendency in the normal direction and the oblique direction and the viewing angle characteristics exhibit ideal behavior. Thus, a line closer to the straight line L indicates better viewing angle characteristics, which means that particularly white blur in the oblique direction is further reduced.

The liquid crystal display devices of Examples 1 to 3 exhibited higher transmittance than the liquid crystal display device of Comparative Example 4, as shown in FIG. 8. This shows that the liquid crystal display devices of Examples 1 to 3 reduced the effect of the dark lines that were generated in conventional devices, resulting in increased transmittance.

Further, as shown in FIG. 9, the liquid crystal display devices of Examples 1 to 3 exhibited better viewing angle characteristics mainly from the halftone display to the white display (e.g., in the range of the relative transmittance ratio of 0.2 to 1.0) than the liquid crystal display device of Comparative Example 4. This shows that the liquid crystal display devices of Examples 1 to 3 further reduce white blur in the oblique direction mainly from the halftone display to the white display than the liquid crystal display device of Comparative Example 4. This difference in the degree of white blur can also be described as follows. First, as a representative of the devices of Examples 1 to 3, the liquid crystal display device of Example 2 is described. As shown in FIG. 5, the shapes of the lines indicating the transmittance characteristics in the graph are similar to each other in the normal direction and the oblique direction, and the difference in transmittance between both directions is small. As a result, white blur in the oblique direction is reduced. In contrast, in the liquid crystal display device of Comparative Example 4, as shown in FIG. 6, the shapes of the lines indicating the transmittance characteristics in the graph are not similar to each other in the normal direction and the oblique direction, and particularly, in the area where the applied voltage is higher, the difference in transmittance between both directions tends to increase. As a result, white blur in the oblique direction is not reduced.

Based on the above, it was found that the liquid crystal display devices of Examples 1 to 3 have excellent viewing angle characteristics and high transmittance.

The liquid crystal display device of Comparative Example 1 exhibited slightly lower transmittance than the liquid crystal display device of Comparative Example 4 as shown in FIG. 8, and exhibited considerably poorer viewing angle characteristics than the liquid crystal display device of Comparative Example 4 as shown in FIG. 9.

The liquid crystal display device of Comparative Example 2 exhibited higher transmittance than the liquid crystal display device of Comparative Example 4 as shown in FIG. 8, but exhibited considerably poorer viewing angle characteristics than the liquid crystal display device of Comparative Example 4 as shown in FIG. 9.

The liquid crystal display device of Comparative Example 3 exhibited better viewing angle characteristics mainly from the halftone display to the white display (e.g., in the range of the relative transmittance ratio of 0.2 to 1.0) than the liquid crystal display device of Comparative Example 4 as shown in FIG. 9, but exhibited considerably lower transmittance than the liquid crystal display device of Comparative Example 4 as shown in FIG. 8.

The liquid crystal display device of Comparative Example 5 exhibited higher transmittance than the liquid crystal display device of Comparative Example 4 as shown in FIG. 8, but exhibited considerably poorer viewing angle characteristics than the liquid crystal display device of Comparative Example 4 as shown in FIG. 9.

As described above, it was found that the liquid crystal display devices of the embodiment (examples) described above have excellent viewing angle characteristics and high transmittance. Next, with reference to study examples, a preferred range of the width of each of the first area of the first retardation layer and the third area of the second retardation layer (W in FIG. 2) in the liquid crystal display device is described based on the simulation results.

Study Examples 1

A liquid crystal display device of Study Examples 1 was the same as the liquid crystal display device of Example 1 except that the simulation parameters of the first retardation layer and the second retardation layer were changed as follows.
<First Retardation Layer>
(First Area)
Thickness: 0.8 μm
Width: 3 μm
nx: 1.5000
ny: 1.6375
nz: 0
Re: 0.110 μm
Azimuth of in-plane slow axis: 45°
(Second Area)
Thickness: 0.8 μm
Re: 0 μm (isotropic layer)
<Second Retardation Layer>
(Third Area)
Thickness: 0.8 μm
Width: 3 μm
nx: 1.5000
ny: 1.6375
nz: 0
Re: 0.110 μm
Azimuth of in-plane slow axis: −45°

(Fourth Area)
Thickness: 0.8 μm
Re: 0 μm (isotropic layer)

Study Examples 2 to 20

A liquid crystal display device of each of these study examples was the same as the liquid crystal display device of Study Example 1 except that the simulation parameters of the first retardation layer and the second retardation layer were changed as shown in Table 1 (in each of the study examples, the thickness of each of the second area and the fourth area were the same as the thickness of each of the first area and the third area).
[Evaluation 2]

For the liquid crystal display devices of Study. Examples 1 to 20, the transmittance characteristics (relationship between transmittance and applied voltage) in the normal direction and the oblique direction (a direction at a polar angle of 60° and an azimuth angle of 45°) were simulated using "LCD Master 3D" available from Shintech, Inc. It was assumed that the black state was displayed when the applied voltage was 0 V, and the white state was displayed when the applied voltage was 7.5 V.

Next, the following evaluations were made based on the transmittance characteristics simulation results of the liquid crystal display devices of the examples.
<Comparison of Transmittance>

Table 1 shows the relative transmittance ratio in the normal direction of the liquid crystal display device of each example. The title "Relative transmittance ratio in normal direction" in Table 1 indicates the transmittance in the normal direction of the liquid crystal display device of each example, which was normalized using the transmittance in the normal direction of the liquid crystal display device of Comparative Example 5 as the standard (1.0) when the applied voltage was 7.5 V.

Table 1 shows the transmittance evaluation results of the liquid crystal display device of each example based on the following criteria.
A: The transmittance was higher than that of the liquid crystal display device of Comparative Example 4 (relative transmittance ratio in the normal direction in FIG. 8: 0.57).
B: The transmittance was slightly lower than that of the liquid crystal display device of Comparative Example 4 (relative transmittance ratio in the normal direction in FIG. 8: 0.57), but was higher than that of the liquid crystal display device of Comparative Example 3 (relative transmittance ratio in the normal direction in FIG. 8: 0.40).
<Comparison of Viewing Angle Characteristics>

Figure 10:
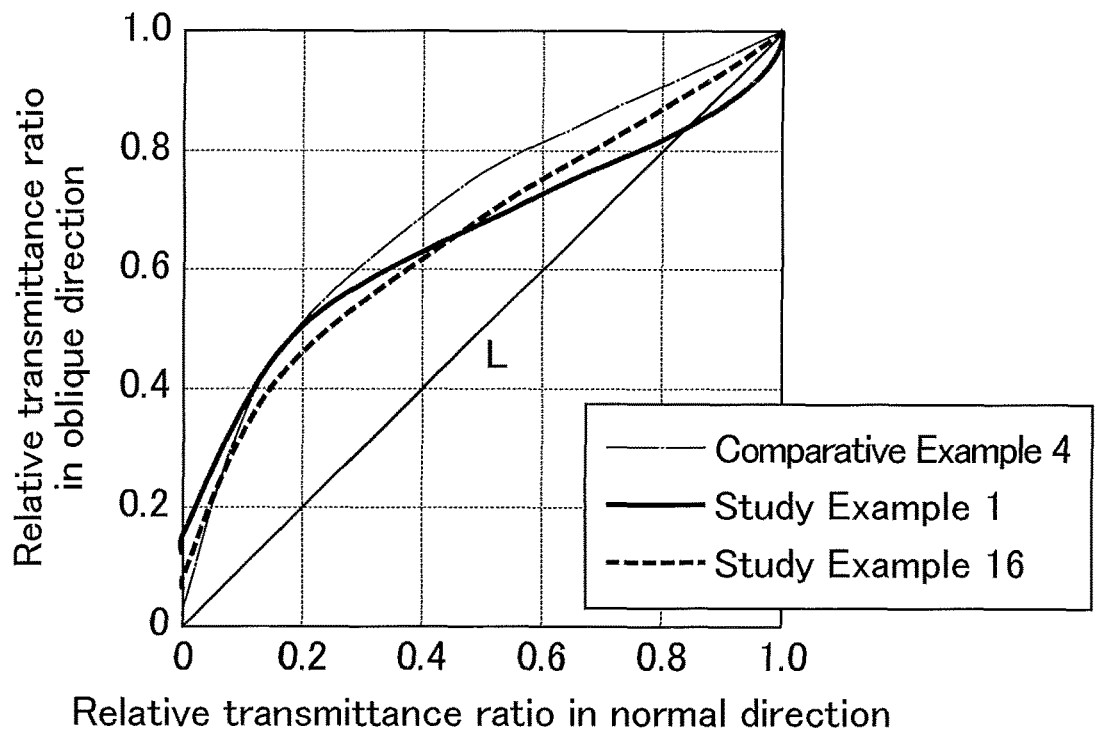
FIG. 10 is a graph showing viewing angle characteristics of liquid crystal display devices of Study Examples 1 and 16.
Figure 11:
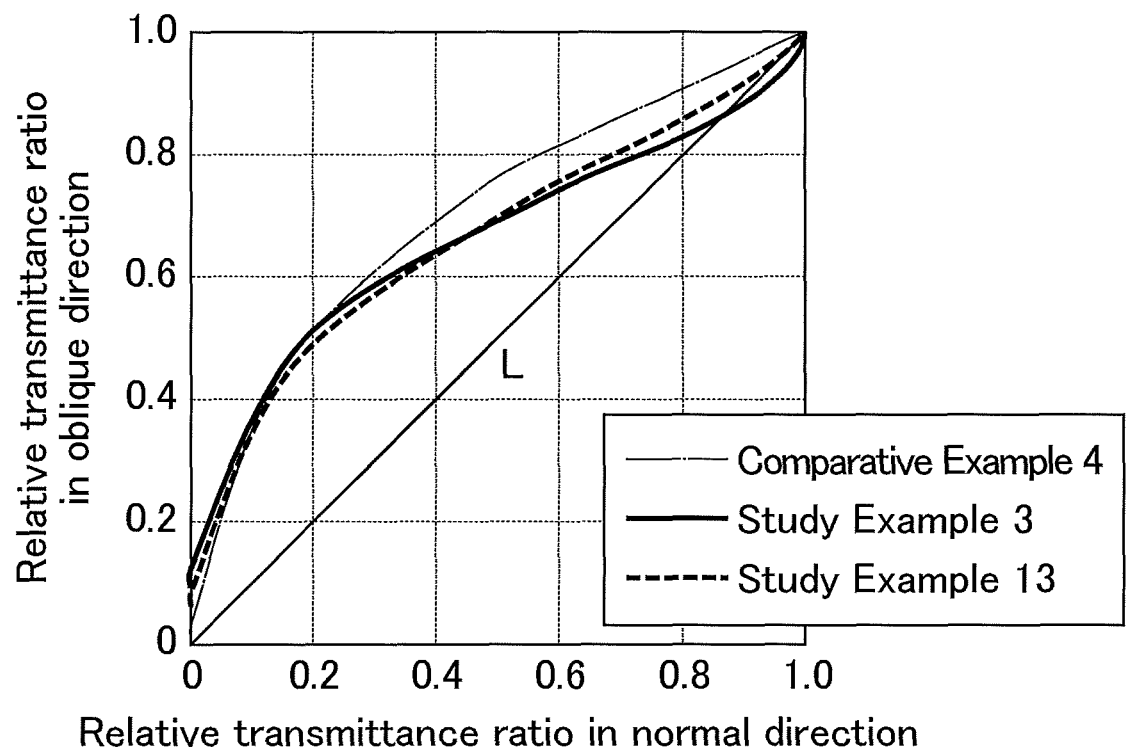
FIG. 11 is a graph showing viewing angle characteristics of liquid crystal display devices of Study Examples 3 and 13.
Figure 12:
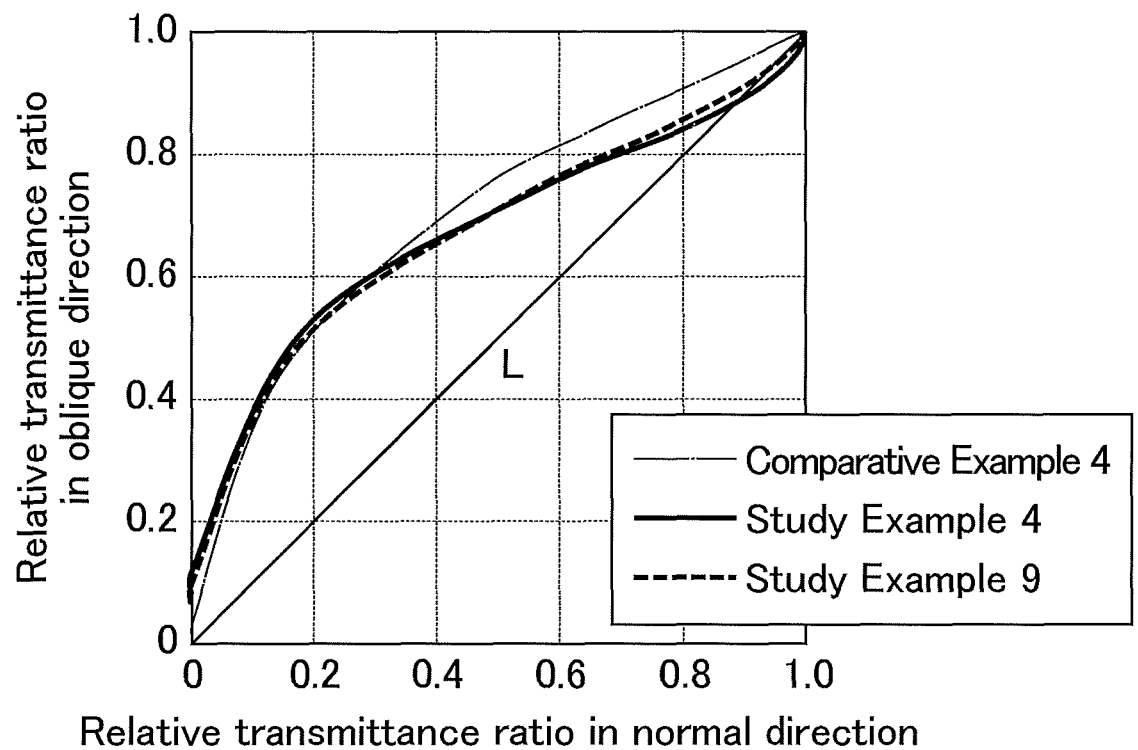
FIG. 12 is a graph showing viewing angle characteristics of liquid crystal display devices of Study Examples 4 and 9.
Figure 13:
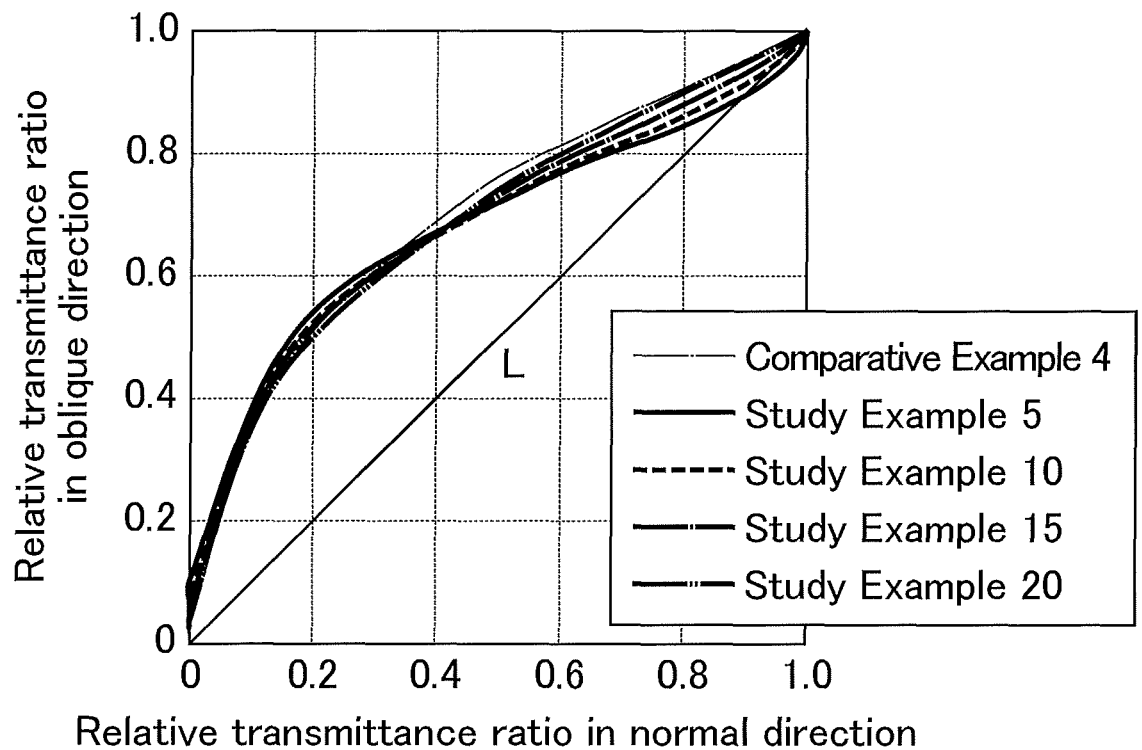
FIG. 13 is a graph showing viewing angle characteristics of liquid crystal display devices of Study Examples 5, 10, 15, and 20.
Figure 14:
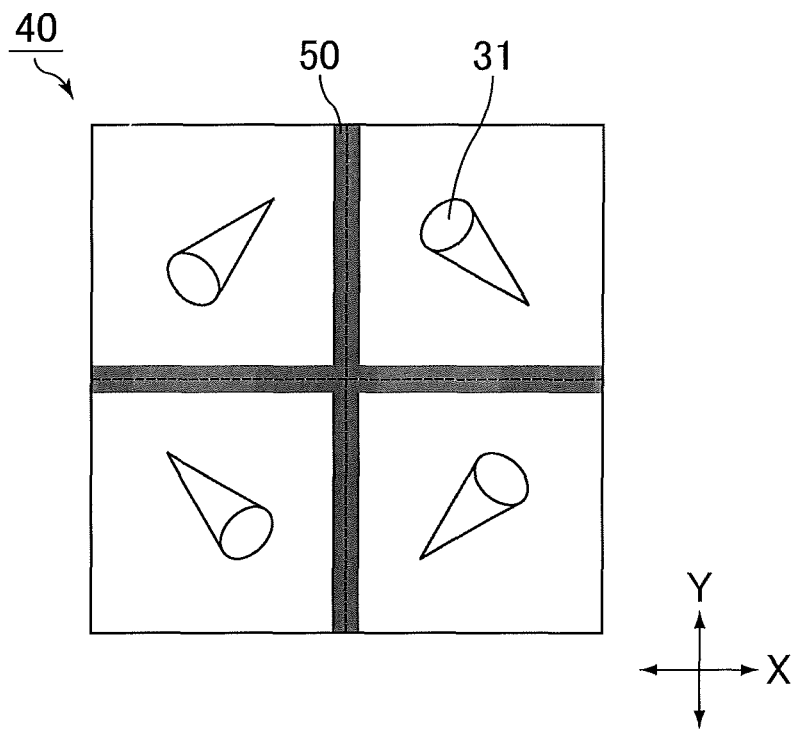
FIG. 14 is a schematic plan view showing exemplary tilt azimuths of liquid crystal molecules in a pixel region of a conventional liquid crystal display device that employs an alignment division technique.

FIGS. 10 to 13 are graphs showing viewing angle characteristics of representative liquid crystal display devices among those of Study Examples 1 to 20. FIG. 10 is a graph showing viewing angle characteristics of the liquid crystal display devices of Study Examples 1 and 16. FIG. 11 is a graph showing viewing angle characteristics of the liquid crystal display devices of Study Examples 3 and 13. FIG. 12 is a graph showing viewing angle characteristics of the liquid crystal display devices of Study Examples 4 and 9. FIG. 13 is a graph showing viewing angle characteristics of the liquid crystal display devices of Study Examples 5, 10, 15, and 20. The title "Relative transmittance ratio in oblique direction" of the vertical axis in each of FIGS. 10 to 13 indicates the transmittance in the oblique direction corresponding to each applied voltage, which was normalized using the transmittance in the oblique direction as the standard (1.0) when the applied voltage was 7.5 V. The title "Relative transmittance ratio in normal direction" of the horizontal axis in each of FIGS. 10 to 13 indicates the transmittance in the normal direction corresponding to each applied voltage, which was normalized using the transmittance in the normal direction as the standard (1.0) when the applied voltage was 7.5 V. A straight line L in each of FIGS. 10 to 13 corresponds to the case where the transmittance characteristics (relationship between transmittance and applied voltage) exhibit the same tendency in the normal direction and the oblique direction and the viewing angle characteristics exhibit ideal behavior. Thus, a line closer to the straight line L indicates better viewing angle characteristics, which means that particularly white blur in the oblique direction is further reduced. FIGS. 10 to 13 each also show a line indicating viewing angle characteristics of the liquid crystal display device of Comparative Example 4 for comparison.

In comparison of viewing angle characteristics in each of FIGS. 10 to 13, a focus was placed on "Relative transmittance ratio in oblique direction" (vertical axis) when "Relative transmittance ratio in normal direction" (horizontal axis) was 0.2.

When the width of each of the first area of the first retardation layer and the third area of the second retardation layer was 3 μm, as shown in FIG. 10, the liquid crystal display devices of Study Examples 1 and 16 exhibited better viewing angle characteristics (white blur in the oblique direction was reduced) than those of the liquid crystal display device of Comparative Example 4. Although not shown in FIG. 10, the liquid crystal display devices of Study Examples 6 and 11 also exhibited better viewing angle characteristics (white blur in the oblique direction was reduced) than those of the liquid crystal display device of Comparative Example 4.

When the width of each of the first area of the first retardation layer and the third area of the second retardation layer was 7 μm, although not shown, the liquid crystal display devices of Study Examples 2, 7, 12, and 17 exhibited better viewing angle characteristics (white blur in the oblique direction was reduced) than those of the liquid crystal display device of Comparative Example 4.

When the width of each of the first area of the first retardation layer and the third area of the second retardation layer was 10 μm, as shown in FIG. 11, the liquid crystal display devices of Study Examples 3 and 13 exhibited better viewing angle characteristics (white blur in the oblique direction was reduced) than those of the liquid crystal display device of Comparative Example 4. Although not shown in FIG. 11, the liquid crystal display devices of Study Examples 8 and 18 also exhibited better viewing angle characteristics (white blur in the oblique direction was reduced) than those of the liquid crystal display device of Comparative Example 4.

When the width of each of the first area of the first retardation layer and the third area of the second retardation layer was 15 μm, as shown in FIG. 12, the liquid crystal display device of Study Example 9 exhibited better viewing angle characteristics (white blur in the oblique direction was reduced) than those of the liquid crystal display device of Comparative Example 4. Although not shown in FIG. 12, the liquid crystal display devices of Study Examples 14 and 19 also exhibited better viewing angle characteristics (white blur in the oblique direction was reduced) than those of the liquid crystal display device of Comparative Example 4. In contrast, the liquid crystal display device of Study Example 4 exhibited slightly poorer viewing angle characteristics than those of the liquid crystal display device of Comparative Example 4 as shown in FIG. 12, but exhibited better viewing angle characteristics (white blur in the oblique direction was reduced) than those of the liquid crystal display devices of Comparative Examples 1 and 2 (FIG. 9).

When the width of each of the first area of the first retardation layer and the third area of the second retardation layer was 20 μm, as shown in FIG. 13, the liquid crystal display devices of Study Example 15 and 20 exhibited better viewing angle characteristics (white blur in the oblique direction was reduced) than those of the liquid crystal display device of Comparative Example 4. In contrast, the liquid crystal display devices of Study Examples 5 and 10 exhibited slightly poorer viewing angle characteristics than those of the liquid crystal display device of Comparative Example 4 as shown in FIG. 13, but exhibited better viewing angle characteristics (white blur in the oblique direction was reduced) than those of the liquid crystal display devices of Comparative Examples 1 and 2 (FIG. 9).

Table 1 shows the viewing angle characteristics evaluation results of the liquid crystal display device of each example based on the following criteria.

A: The viewing angle characteristics were better than those of the liquid crystal display device of Comparative Example 4
B: The viewing angle characteristics were slightly poorer than those of the liquid crystal display device of Comparative Example 4, but were better than those of the liquid crystal display devices of Comparative Examples 1 and 2.

TABLE 1

| | First area and third area | | | Transmittance | | Viewing angle characteristics Rating |
|---|---|---|---|---|---|---|
| | In-plane phase difference (μm) | Thickness (μm) | Width (μm) | Relative transmittance ratio in normal direction | Rating | |
| Study Example 1 | 0.110 | 0.8 | 3 | 0.65 | A | A |
| Study Example 2 | | | 7 | 0.71 | A | A |
| Study Example 3 | | | 10 | 0.75 | A | A |
| Study Example 4 | | | 15 | 0.80 | A | B |
| Study Example 5 | | | 20 | 0.83 | A | B |
| Study Example 6 | 0.124 | 0.9018 | 3 | 0.64 | A | A |
| Study Example 7 | | | 7 | 0.70 | A | A |
| Study Example 8 | | | 10 | 0.74 | A | A |
| Study Example 9 | | | 15 | 0.78 | A | A |
| Study Example 10 | | | 20 | 0.81 | A | B |
| Study Example 11 | 0.138 | 1.004 | 3 | 0.61 | A | A |
| Study Example 12 | | | 7 | 0.67 | A | A |
| Study Example 13 | | | 10 | 0.70 | A | A |

TABLE 1-continued

|  | First area and third area | | | Transmittance | | Viewing angle characteristics Rating |
|---|---|---|---|---|---|---|
|  | In-plane phase difference (μm) | Thickness (μm) | Width (μm) | Relative transmittance ratio in normal direction | Rating |  |
| Study Example 14 |  |  | 15 | 0.75 | A | A |
| Study Example 15 |  |  | 20 | 0.78 | A | A |
| Study Example 16 | 0.165 | 1.2 | 3 | 0.50 | B | A |
| Study Example 17 |  |  | 7 | 0.55 | B | A |
| Study Example 18 |  |  | 10 | 0.58 | A | A |
| Study Example 19 |  |  | 15 | 0.64 | A | A |
| Study Example 20 |  |  | 20 | 0.69 | A | A |

As shown in Table 1, it was found that a preferred range of the width of each of the first area of the first retardation layer and the third area of the second retardation layer in terms of transmittance and viewing angle characteristics (where the transmittance and the viewing angle characteristics are both rated as A) varies as follows depending on the in-plane phase difference.

(1) When the first area and the third area each have an in-plane phase difference of 0.110 μm, the width of each of the first area and the third area is preferably 3 to 10 μm.
(2) When the first area and the third area each have an in-plane phase difference of 0.124 μm, the width of each of the first area and the third area is preferably 3 to 15 μm.
(3) When the first area and the third area each have an in-plane phase difference of 0.138 μm, the width of each of the first area and the third area is preferably 3 to 20 μm.
(4) When the first area and the third area each have an in-plane phase difference of 0.165 μm, the width of each of the first area and the third area is preferably 10 to 20 μm.

The lower limit was set to 3 μm for the range of the width of each of the first area of the first retardation layer and the third area of the second retardation layer for evaluation. This is because that usual UV irradiation accuracy (lower limit: about 3 μm) was assumed which allows the first area and the third area to exhibit in-plane phase differences, for example, as in photoalignment treatment that is performed to allow the first horizontal alignment film and the second horizontal alignment film to exhibit horizontal alignment properties (uniaxial alignment properties).

[Additional Remarks]

According to an aspect, the present invention may provide a liquid crystal display device including in the stated order: a first polarizing plate; a first substrate; a first vertical alignment film; a liquid crystal layer containing liquid crystal molecules; a second vertical alignment film; a second substrate; and a second polarizing plate, wherein in a pixel region, the liquid crystal molecules are aligned vertically to a surface of the first vertical alignment film and a surface of the second vertical alignment film when no voltage is applied to the liquid crystal layer, and are aligned divisionally into at least four domains of mutually different tilt azimuths of the liquid crystal molecules when a voltage is applied to the liquid crystal layer, a first retardation layer containing a cured product of a first polymerizable liquid crystal compound is disposed between the first polarizing plate and the liquid crystal layer, a second retardation layer containing a cured product of a second polymerizable liquid crystal compound is disposed between the second polarizing plate and the liquid crystal layer, the first retardation layer includes a first area and a second area having mutually different in-plane phase differences, the second retardation layer includes a third area and a fourth area having mutually different in-plane phase differences, the first area and the third area overlap boundaries between the at least four domains in a plan view and each have an in-plane phase difference of 0.109 to 0.165 μm, an in-plane slow axis of the first area is orthogonal to an in-plane slow axis of the third area, an absorption axis of the first polarizing plate and the in-plane slow axis of the first area form an angle of substantially 45° therebetween, an absorption axis of the second polarizing plate and the in-plane slow axis of the third area form an angle of substantially 45° therebetween, and the absorption axis of the first polarizing plate is orthogonal to the absorption axis of the second polarizing plate. According to this aspect, a liquid crystal display device having excellent viewing angle characteristics and high transmittance can be achieved.

The first retardation layer may be disposed between the first substrate and the first vertical alignment film. This enables arrangement of the first retardation layer inside the liquid crystal panel (in-cell arrangement of the first retardation layer).

A first horizontal alignment film may be disposed between the first substrate and the first retardation layer. This allows the cured product of the first polymerizable liquid crystal compound to be efficiently imparted with alignment properties to exhibit the in-plane phase difference.

The second retardation layer may be disposed between the second substrate and the second vertical alignment film. This enables arrangement of the second retardation layer inside the liquid crystal panel (in-cell arrangement of the second retardation layer).

A second horizontal alignment film may be disposed between the second substrate and the second retardation layer. This allows the cured product of the second polymerizable liquid crystal compound to be efficiently imparted with alignment properties to exhibit the in-plane phase difference.

The second area and the fourth area may not have an in-plane phase difference. This results in a configuration which is optically equivalent to that of a conventional liquid crystal display device that employs an alignment division technique, in terms of light that is transmitted through the second area and the fourth area. Thus, excellent viewing angle characteristics are achieved.

The at least four domains may include four domains arranged in a matrix of two rows and two columns, and the first area and the third area may be cross-shaped in a plan view. This increases the transmittance without any dark lines visible at the boundaries between the four domains.

When the azimuth of the absorption axis of the first polarizing plate is defined as 0° and the anticlockwise direction is defined as positive, the four domains may include a domain in which the tilt azimuth is substantially 45°, a domain in which the tilt azimuth is substantially 135°, a domain in which the tilt azimuth is substantially 225°, and a domain in which the tilt azimuth is substantially 315°. This efficiently increases the transmittance.

What is claimed is:

1. A liquid crystal display device comprising in the stated order:
   a first polarizing plate;
   a first substrate;
   a first vertical alignment film;
   a liquid crystal layer containing liquid crystal molecules;
   a second vertical alignment film;
   a second substrate; and
   a second polarizing plate,
   wherein in a pixel region, the liquid crystal molecules are aligned vertically to a surface of the first vertical alignment film and a surface of the second vertical alignment film when no voltage is applied to the liquid crystal layer, and are aligned divisionally into at least four domains of mutually different tilt azimuths of the liquid crystal molecules when a voltage is applied to the liquid crystal layer,
   a first retardation layer containing a cured product of a first polymerizable liquid crystal compound is disposed between the first polarizing plate and the liquid crystal layer,
   a second retardation layer containing a cured product of a second polymerizable liquid crystal compound is disposed between the second polarizing plate and the liquid crystal layer,
   the first retardation layer includes a first area and a second area having mutually different in-plane phase differences,
   the second retardation layer includes a third area and a fourth area having mutually different in-plane phase differences,
   the first area and the third area overlap boundaries between the at least four domains in a plan view and each have an in-plane phase difference of 0.109 to 0.165 μm,
   an in-plane slow axis of the first area is orthogonal to an in-plane slow axis of the third area,
   an absorption axis of the first polarizing plate and the in-plane slow axis of the first area form an angle of substantially 45° therebetween,
   an absorption axis of the second polarizing plate and the in-plane slow axis of the third area form an angle of substantially 45° therebetween, and
   the absorption axis of the first polarizing plate is orthogonal to the absorption axis of the second polarizing plate.

2. The liquid crystal display device according to claim 1, wherein the first retardation layer is disposed between the first substrate and the first vertical alignment film.

3. The liquid crystal display device according to claim 2, wherein a first horizontal alignment film is disposed between the first substrate and the first retardation layer.

4. A liquid crystal display device according to claim 1, wherein the second retardation layer is disposed between the second substrate and the second vertical alignment film.

5. The liquid crystal display device according to claim 4, wherein a second horizontal alignment film is disposed between the second substrate and the second retardation layer.

6. The liquid crystal display device according to claim 1, wherein the second area and the fourth area do not have an in-plane phase difference.

7. The liquid crystal display device according to claim 1, wherein the at least four domains include four domains arranged in a matrix of two rows and two columns, and the first area and the third area are cross-shaped in a plan view.

8. The liquid crystal display device according to claim 7, wherein when the azimuth of the absorption axis of the first polarizing plate is defined as 0° and the anticlockwise direction is defined as positive, the four domains include a domain in which the tilt azimuth is substantially 45°, a domain in which the tilt azimuth is substantially 135°, a domain in which the tilt azimuth is substantially 225°, and a domain in which the tilt azimuth is substantially 315°.

* * * * *